(12) United States Patent
Hule et al.

(10) Patent No.: US 10,766,981 B2
(45) Date of Patent: Sep. 8, 2020

(54) BIMODAL POLYPROPYLENES AND METHOD OF MAKING SAME

(71) Applicant: ExxonMobil Chemical Patents Inc., Baytown, TX (US)

(72) Inventors: Rohan A. Hule, Houston, TX (US); Sudhin Datta, Houston, TX (US); Yi Ping Ni, Shanghai (CN)

(73) Assignee: ExxonMobil Chemical Patents Inc., Baytown, TX (US)

( * ) Notice: Subject to any disclaimer, the term of this patent is extended or adjusted under 35 U.S.C. 154(b) by 290 days.

(21) Appl. No.: 15/746,965

(22) PCT Filed: Aug. 4, 2015

(86) PCT No.: PCT/US2015/043575
§ 371 (c)(1),
(2) Date: Jan. 23, 2018

(87) PCT Pub. No.: WO2016/053468
PCT Pub. Date: Apr. 7, 2016

(65) Prior Publication Data
US 2018/0258203 A1 Sep. 13, 2018

Related U.S. Application Data

(60) Provisional application No. 62/057,526, filed on Sep. 30, 2014.

(51) Int. Cl.
*C08F 110/06* (2006.01)
*C08L 23/12* (2006.01)

(52) U.S. Cl.
CPC ............. *C08F 110/06* (2013.01); *C08L 23/12* (2013.01); *C08F 2500/05* (2013.01); *C08F 2500/12* (2013.01); *C08F 2500/17* (2013.01); *C08L 2203/30* (2013.01); *C08L 2205/025* (2013.01); *C08L 2205/035* (2013.01)

(58) Field of Classification Search
CPC .... C08F 110/06; C08L 23/12; C08L 2500/05; C08L 2500/12; C08L 2203/30; C08L 2205/025; C08L 2205/035
See application file for complete search history.

(56) References Cited

U.S. PATENT DOCUMENTS

| 87,750 A | 3/1869 | Agnew et al. |
|---|---|---|
| 4,379,759 A | 4/1983 | Goeke et al. |
| 5,026,798 A | 6/1991 | Canich |
| 5,198,401 A | 3/1993 | Turner et al. |
| 5,504,172 A | 4/1996 | Imuta et al. |
| 5,698,650 A | 12/1997 | Jourdain et al. |
| 5,738,745 A | 4/1998 | Hudson et al. |
| 5,744,548 A | 4/1998 | Nohr et al. |
| 5,770,753 A | 6/1998 | Kuber et al. |
| 6,087,750 A | 7/2000 | Raad |
| 6,207,750 B1 | 3/2001 | Lin et al. |
| 6,245,846 B1 | 6/2001 | Daniels et al. |
| 6,350,828 B1 | 2/2002 | Takaoka et al. |
| 6,376,610 B1 | 4/2002 | Dharmarajan et al. |
| 6,451,425 B1 | 9/2002 | Kozulla et al. |
| 6,525,157 B2 | 2/2003 | Cozewith et al. |
| 6,642,316 B1 | 11/2003 | Datta et al. |
| 6,686,415 B1 | 2/2004 | Terfloth et al. |
| 6,747,103 B1 | 6/2004 | Vestberg et al. |
| 6,747,114 B2 | 6/2004 | Karandinos et al. |
| 6,809,168 B2 | 10/2004 | Agarwal et al. |
| 7,319,122 B2 | 1/2008 | Cheng et al. |
| 9,279,024 B2 | 3/2016 | Holtcamp et al. |
| 9,676,882 B2 | 6/2017 | Holtcamp et al. |
| 2002/0004575 A1 | 1/2002 | Cozewith et al. |
| 2002/0045712 A1 | 4/2002 | Hashimoto et al. .......... 525/240 |
| 2004/0151901 A1 | 8/2004 | Pearson et al. |
| 2005/0032959 A1 | 2/2005 | Cheung et al. |
| 2005/0039259 A1 | 2/2005 | Gladney |
| 2005/0182198 A1 | 8/2005 | Cheng et al. |
| 2008/0214767 A1 | 9/2008 | Mehta et al. ................. 526/351 |
| 2008/0249231 A1 | 10/2008 | Datta et al. |
| 2009/0253868 A1 | 10/2009 | Massari et al. |
| 2011/0105690 A1 | 5/2011 | Meka et al. |
| 2011/0118370 A1 | 5/2011 | Jiang et al. |
| 2012/0015170 A1 | 1/2012 | Doshev et al. |
| 2012/0270039 A1 | 10/2012 | Tynys et al. |

(Continued)

FOREIGN PATENT DOCUMENTS

| EP | 0 129 368 | 12/1984 |
|---|---|---|
| EP | 1 801 155 A | 6/2007 |
| EP | 2 386 601 A | 11/2011 |

OTHER PUBLICATIONS

Cheng, "13C NMR Analysis of Ethylene-Propylene Rubbers", Macromolecules, 1984, vol. 17, pp. 1950-1955.
Wheeler et al., "Gel Permeation Chromatography/Fourier Transform Infrared Interface for Polymer Analysis", Applied Spectroscopy, vol. 47, No. 8, 1993, pp. 1128-1130.
Yu, "Impact Modification of Polypropylenes with EXACT Plastomers," ANTEC, 1994, pp. 2439-2441.
Moore, Jr., "Polypropylene: The Material, Polypropylene Handbook—Polymerization, Characterization, Properties, Processing, Applications," 1996, Chapter 1, pp. 1-10.
Phillips et al., "Structure and Morphology, Polypropylene Handbook—Polymerization, Characterization, Properties, Processing, Applications," 1996, Chapter 3, pp. 113-176.

(Continued)

*Primary Examiner* — Irina S Zemel
*Assistant Examiner* — Jeffrey S Lenihan
(74) *Attorney, Agent, or Firm* — Catherine L. Bell

(57) ABSTRACT

Bimodal polypropylene compositions and a process to form melt blended bimodal polypropylene compositions comprising combining at least two polypropylenes in at least a two-pass process, and forming a bimodal polypropylene composition having a Flexural Modulus (190° C., 1% secant) of at least 1700 MPa, as well as one or more other selected properties. These compositions are suitable for thermoformed articles and injection molded articles, any of which may be foamed.

31 Claims, 4 Drawing Sheets

(56) References Cited

U.S. PATENT DOCUMENTS

| | | |
|---|---|---|
| 2012/0295994 A1 | 11/2012 | Bernreitner et al. |
| 2012/0329951 A1 | 12/2012 | Gloger et al. |
| 2013/0123431 A1 | 5/2013 | Filipe et al. |
| 2014/0155854 A1* | 6/2014 | MacDonald ........... D04H 1/435 604/372 |
| 2017/0233566 A1 | 8/2017 | Datta et al. |

OTHER PUBLICATIONS

Albizzati et al, "Catalysts and Polymerizations, Polypropylene Handbook—Polymerization, Characterization, Properties, Processing, Applications," 1996, Chapter 2, pp. 11-111.

Rabinowitsch, B., "Uber Die Viskositat und Elastiztat Von Solen", Z. Physik. Chem., A145, No. 1, 1929.

Weng, W., et al., "Long Chain Branched Isotatic Polypropylene" Macromolecules, vol. 35, pp. 3838-3843, 2002.

Elmoumni, A., et al., "Isotactic Poly(propylene) Crystallization: Role of Small Fractions of High or Low Molecular Weight Polymer," Macromolecular Chemistry and Physics, vol. 206, pp. 125-134, 2005.

Seki, M., et al., "Shear-Mediated Crystallization of Isotactic Polypropylene: The Role of Long Chain-Long Chain Overlap," Macromolecules, vol. 35, pp. 2583-2594, 2002.

Minoshima, W., et al., "Experimental Investigations of the Influence of Molecular Weight Distribution on the Rheological Properties of Polypropylene Melts," Polymer Engineering and Science, vol. 20, No. 17, pp. 1166-1176, 1980.

Sugimoto, M., et al., "Melt rheology of long-chain-branched polypropylenes" Rheol Acta, vol. 46, pp. 33-44, 2006.

Spitael, P., et al., "Strain Hardening in Polypropylenes and Its Role in Extrusion Foaming" Polymer Engineering and Science, vol. 44, No. 11, pp. 2090-2100, 2004.

Lopez Moya, E., et al., "Bimodal Poly(propylene) through Binary Metallocene Catalytic Systems as an Alternative to Melt Blending" Macromolecular Symosia, vol. 321-322, pp. 46-52, 2012.

* cited by examiner

BIMODAL POLYPROPYLENES AND METHOD OF MAKING SAME

CROSS-REFERENCE TO RELATED APPLICATION

The present application is a National Phase Application claiming priority to PCT Application Serial No. PCT/US2015/043575 filed Aug. 4, 2015, which claims priority to U.S. Ser. No. 62/057,526, filed Sep. 30, 2014, the disclosures of which are incorporated herein by reference.

FIELD OF THE INVENTION

The present invention(s) is directed to bimodal polypropylene compositions, preferably formed from polypropylenes made using single-site catalysts, and methods of making such compositions.

BACKGROUND OF THE INVENTION

Enhanced stiffness combined with superior processability has been a long-standing interest in the polypropylene (PP) industry. Some attempts to achieve this balance include the use of bimodal PP blends, either in situ (in reactor) or ex situ (extruder blends), that include a combination of a relatively low molecular weight polypropylene (or high MFR) and a relatively high molecular weight polypropylene (or low MFR). The challenge is particularly relevant for blends of single-site based PP's (ssPP's), which alone are not easily processable.

In particular, use of a high molecular weight (HMW) PP can lead to improvement in the stiffness of polypropylene blends. However, inclusion of HMW PP in blends may be accompanied by a loss in the processability due to increased viscosity if the properties of the components are not properly balanced. Depending on the ultimate application, solutions to achieve a reasonable balance between stiffness and processability may involve adjusting the properties of the individual polypropylene components and/or addition of some other polymeric additive such as an elastomeric component, either of which may be accompanied by forming bimodal PP blends. While in-reactor methodologies to form bimodal PP blends are well documented, physical blending of two unimodal polypropylenes PP's to realize bimodality has not shown enhanced stiffness and processability, both for single-site (SS) and Ziegler-Natta (ZN) homopolymers.

The present invention describes new bimodal PP compositions prepared by melt blending exhibiting enhanced stiffness and improved rheological properties that translate to superior processability. Both, SS unimodal polypropylenes (ssPP's), as well as ZN-based unimodal PP's currently being utilized in Impact Copolymer (ICP) manufacture have been included as relevant comparisons to demonstrate this improvement. Besides offering an additional pathway to achieve these objectives, physical blending can be easily implemented and practiced using commercial extruders.

Relevant references include: U.S. Pat. Nos. 5,744,548; 6,747,103; 6,809,168; 6,087,750; 6,350,828; 7,319,122; EP 1 801 155; EP 2 386 601; A. Elmoumni et al. in "Isotactic Poly(propylene) Crystallization: Role of Small Fractions of High or Low Molecular Weight Polymer," 26 MACROMOL. CHEM. PHYS. 125-134 (2005); M. Seki et al. in "Shear-Mediated Crystallization of Isotactic Polypropylene: The Role of Long Chain-Long Chain Overlap," 35 MACROMOLECULES 2583-2594 (2002); W. Minoshima et al. in "Experimental Investigations of the Influence of Molecular Weight Distribution on the Rheological Properties of Polypropylene Melts," 20(17) POLY. ENG. & SCI. 1166 (1980); B. Rabinowitsch, A145 Z. PHYSIK. CHEM. 1 (1929); 35 MACROMOLECULES 3838-3843 (2002); 46 RHEOL. ACTA 33-44 (2006); 44 POLY. SCI. AND ENG. 2090-2100 (2004); and MACROMOL. SYMP. 46-52, 321-322 (2012).

SUMMARY OF THE INVENTION

Disclosed are bimodal polypropylene compositions comprising (or consisting of, or consisting essentially of) at least two polypropylenes having a Flexural Modulus (190° C., 1% secant) of at least 1700 MPa, and having one or more of the following characteristics: (a) an $MFR_{bPP}$ within a range from 2 to 200 g/mole or as described herein, or (b) a $MWD_{bPP}$ within a range from 5 to 20 or as described herein, and/or (c) a ΔMw (the difference between the two polypropylenes) of at least 100,000 g/mole or as described herein.

Also disclosed is a process to form the bimodal polypropylene composition comprising (or consisting of, or consisting essentially of) combining at least two polypropylenes in at least a two-pass process, and forming a bimodal polypropylene composition having a Flexural Modulus (190° C., 1% secant) of at least 1700 MPa, and having one or more of the characteristics described further herein.

DETAILED DESCRIPTION OF THE INVENTION

Figure 1:
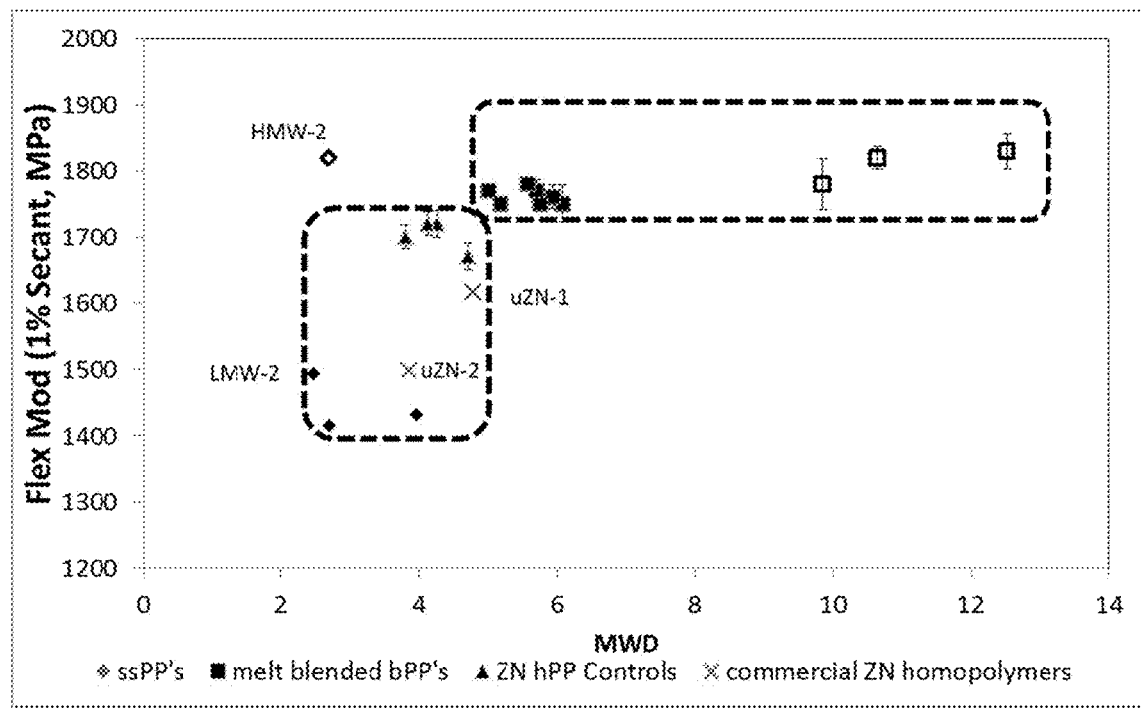
FIG. 1 is a plot of the 1% Flexural Modulus (MPa) as a function of Molecular Weight Distribution (MWD=Mw/Mn) for SS melt blended bimodal polypropylenes (melt blended bPP's), SS unimodals polypropylenes (ssPP's), and unimodal ZN homopolymer polypropylenes (ZN hPP Controls) from Table 1.
Figure 2:
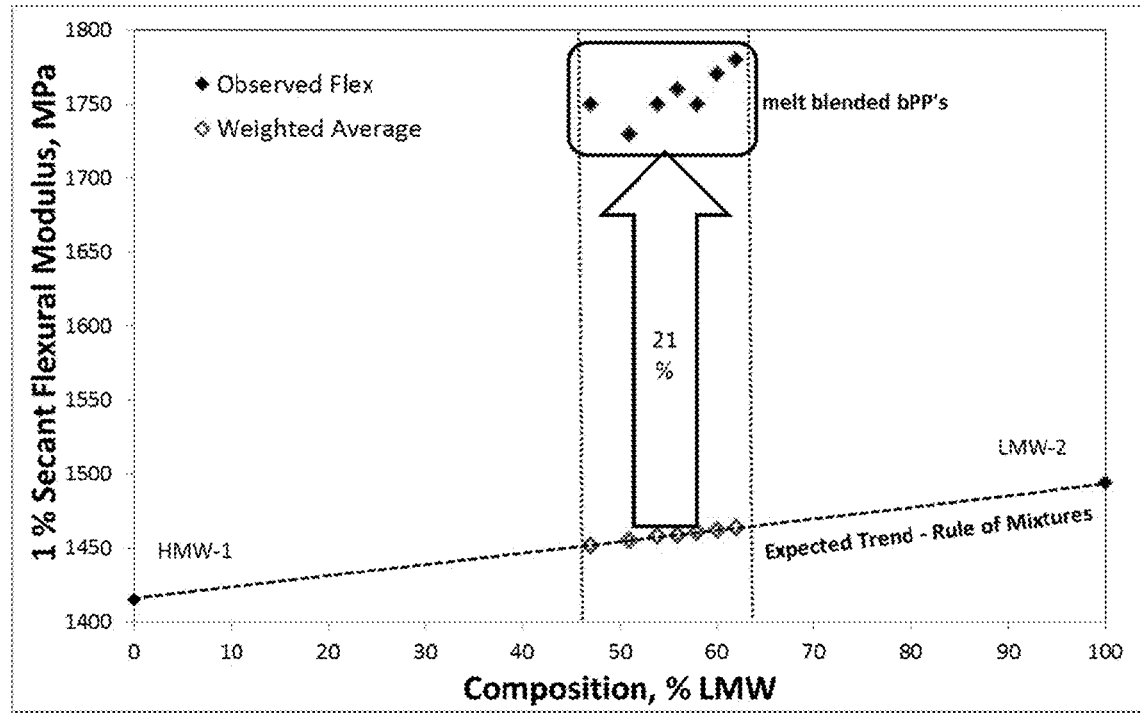
FIG. 2 is a plot of the 1% secant Flexural Modulus of various melt blended bPP's as a function of the amount of low molecular weight polypropylene (LMW) and high molecular weight polypropylene (HMW), overlaid with a "weighted average" ("Rule of Mixtures") when just blending LMW and HMW polypropylenes in Table 1.
Figure 3:
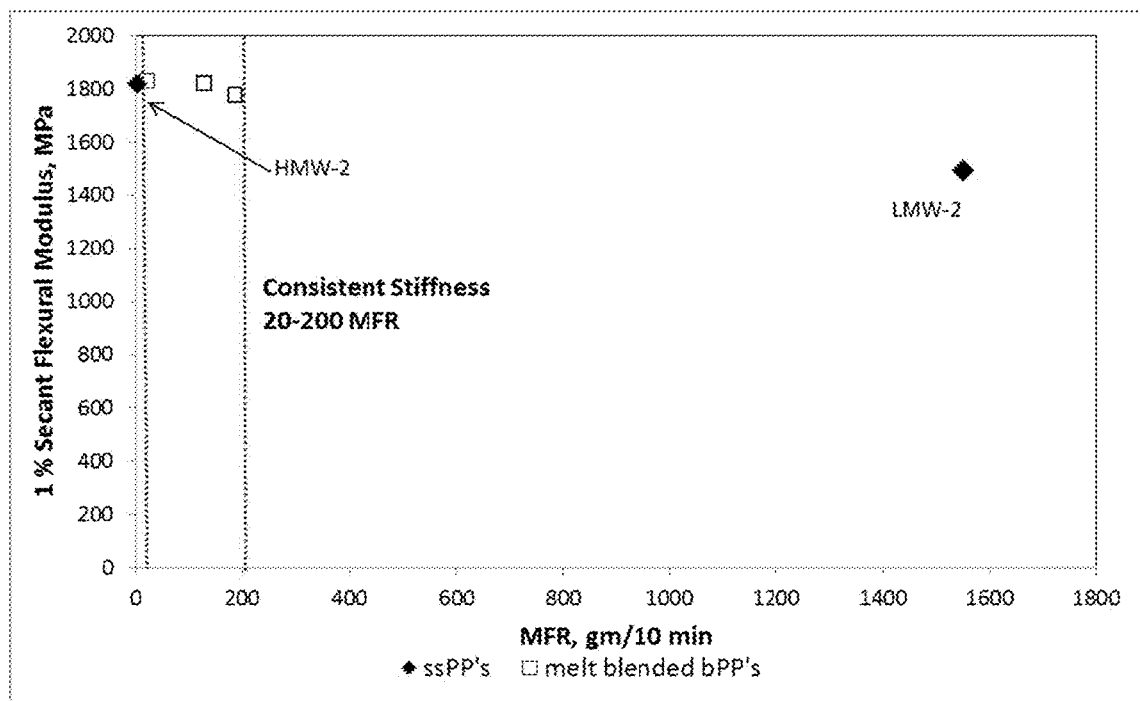
FIG. 3 is a plot of the 1% Flexural Modulus (MPa) vs. melt flow rate (MFR) for melt blended bPP's, ssPP's, and ZN hPP Controls, where the LMW-2 ssPP is included.

The present invention describes bimodal PP compositions prepared by melt blending at least two polypropylenes having different weight average molecular weights (Mw) and preferably produced using a single-site catalyst, where the blend exhibits enhanced stiffness and improved rheological properties that translate to superior processability. Here and throughout, "bimodal" means that the claimed compositions have at least two polymer components having a weight average molecular weight (Mw) different by at least 100,000 g/mole (as referred to herein "$\Delta M_w$") as measured by GPC described herein, but is not limited to compositions demonstrating two or more visible peaks or humps in the curve generated by the chromatograph. Most preferably, these compositions achieve the desired properties with substantially no fillers and substantially no nucleating agents.

Such compositions are attained by choosing polypropylenes, preferably single-site polypropylenes, that allow variability in the molecular weight, and/or ensuring intimate mixing of components using efficient compounding protocols. A few advantages of physical blending include the utilization of two unimodal polypropylenes from distinct catalysts (thus having distinct properties), the applicability to a wide range of Melt Flow Rates (MFRs) from 2 to 200 g/10 min, making it relevant to ICPs and other markets, and the accessibility to a wider selection of single- and twin-screw extruders.

Polypropylenes

The inventive melt blended bPP's may be produced using at least two unimodal polypropylenes made from any type of catalyst, the desirable unimodal polypropylene having the features described herein. The inventive melt blended bPP's are preferably produced using at least two unimodal polypropylenes produced using single-site catalysts (ssPP). Many organometallic compounds are known as useful single-site catalysts such as metallocenes (MN), pyridiyldiamide transition metal catalysts, alkoxide and/or amide transition metal catalysts, bis(imino)pyridyl transition metal catalysts, and many other organometallic compounds useful in polyolefin catalysis known in the art. These compounds are accompanied by activator compounds such as methylalumoxane or boron activators, especially perfluorinated aryl compounds. Together, these and other organometallic compounds known in the art form the "single-site catalysts", such as reviewed by H. Kaneyoshi et al., "Nonmetallocene single-site catalysts for polyolefins" in Research Review (McGraw Hill, 2009); C. De Rosa et al. "Single site metalorganic polymerization catalysis as a method to probe the properties of polyolefins" in 2 POLYM. CHEM. 2155 (2012); I. E. Sedov et al. "Single-site catalysts in the industrial production of polyethylene," 4(2) CATALYSIS IN INDUSTRY 129-140 (2012); and G. W. Coates, "Precise control of polyolefin stereochemistry using single-site metal catalysts," 100 CHEM. REV. 1223 (2000). Most preferably, the single-site catalyst used to make the useful ssPP's herein are metallocenes, accompanied by any type of activator compound, such as described in, for example, U.S. Pat. Nos. 8,318,875; 8,143,353; and 7,524,910. Such catalysts can be used in any desirable process such as a solution, slurry, or gas phase process.

Regardless of the catalyst used to make the PP's, useful polypropylenes will have certain desirable properties. In any embodiment, the PP's have a molecular weight distribution (Mw/Mn) within a range from 2.0, or 2.5 to 3.0, or 3.5, or 4.0, or 4.5. Also, in any embodiment, the PP's have a melt flow rate (MFR, ASTM D1238, 2.16 kg, 230° C.) within a range from 0.2, or 0.5, or 1.0, or 2.0, or 5.0 to 10, or 20, or 30, or 40, or 50, or 80, or 100, or 150, or 200, or 250, or 300, or 400, or 500, or 600, or 800, or 1000, or 1200, or 1400, or 1600, or 2000 g/10 min. In any embodiment, desirable PP's have a melting point temperature ($T_{m2}$) within a range from 140, or 145, or 150° C. to 155, or 160, or 165, or 170° C. Also, in any embodiment the desirable PP's will have an isotacticity as measured by $^{13}$C-NMR of greater than 80, or 85, or 90, or 95, or 98, or 99%.

In any embodiment, useful PP's are either homopolymers of propylene-derived units or copolymers comprising within a range from 0.1, or 0.2, or 0.5 wt % to 2, or 3, or 4, or 5 wt % by weight of the polypropylene copolymer, of ethylene or C4 to C12 α-olefin derived units, the remainder being propylene-derived units. Preferable PP's are polypropylene homopolymers, most preferably isotactic polypropylene homopolymers having features as described above.

The inventive melt blended bPP's preferably comprise at least two, most preferably comprise (or consist of, or consist essentially of) two PP's: a high molecular weight (HMW) polypropylene and a low molecular weight (LMW) polypropylene. Preferably, at least one, but most preferably each polypropylene, is produced using any single-site catalyst known in the art, but most preferably a metallocene catalyst with any type of activator. Each of the HMW and LMW polypropylenes preferably has any one or more of the features as described above, but is particularly characterized by its distinct MFR or molecular weight characteristics. In any embodiment, the HMW polypropylene has a weight average molecular weight (Mw) of 300,000 or 400,000 g/mole or more, or within a range from 300,000, or 400,000 g/mole to 600,000, or 700,000, or 800,000, or 900,000, or 1,000,000 g/mole. In any embodiment, the HMW polypropylene has a number average molecular weight (Mn) of 100,000 or 200,000 g/mole or more, or within a range from 100,000, or 200,000 g/mole to 300,000, or 400,000, or 500,000 g/mole. The HMW polypropylene in any embodiment has an MFR within a range from 0.1, or 0.2 g/10 min to 5, or 10, or 20 g/10 min.

In any embodiment, the LMW polypropylene has a Mw of 300,000, or 200,000 g/mole or less, or within a range from 50,000, or 80,000 g/mole to 100,000, or 200,000, or 300,000 g/mole. In any embodiment, the LMW polypropylene has a Mn of 80,000, or 60,000, or 40,000 g/mole or less, or within a range from 10,000, or 20,000 g/mole to 40,000, or 60,000, or 80,000 g/mole. The LMW polypropylene in any embodiment has an MFR within a range from 5, or 10, or 15 g/10 min to 80, or 100, or 160, or 200, or 500, or 1000, or 1500, or 2000 g/mole.

In any embodiment, within the range from 5, or 10, or 15, or 20, or 25, or 30, or 35, or 40 wt % to 50, or 55, or 60, or 65 wt % (based upon weight of the blend) of a HMW polypropylene is combined with within the range from 35, or 40, or 45, or 50 wt % to 60, or 65, or 70, or 75, or 80, or 85, or 90, or 95 wt % (based upon weight of the blend) of a LMW polypropylene to form the inventive melt blended bPP's.

Process of Melt Blending

At least two, most preferably two PP's as described above are melt blended to form the inventive melt blended bPP's. By "melt blend" what is meant is that the blending or combining of at least two PP's is performed ex situ, that is, outside of the polymerization reactor used to make the individual polypropylene components, and in particular, refers to combining the polypropylenes in a manner to impart heat and/or shear forces to intimately blend the polypropylenes at a temperature at least high enough to melt the highest melting polypropylene such as by a single- or twin-screw extrusion process. Thus disclosed in any embodiment is a process to form the preferably melt blended bimodal polypropylene compositions comprising (or consisting of, or consisting essentially of) combining at least two polypropylenes in at least a two-pass process, and forming a bimodal polypropylene composition having the features described herein.

As described herein, the "two-pass process" refers to a melt blending process that includes at least two passes, preferably two passes, of the two or more polypropylenes through an extruder and is performed in at least two steps:

a first melt blending of the at least two polypropylenes, preferably at least one of the polypropylenes is a ssPP's, then transferring this melt blended mixture to the feeder zone of the same or different extruder and performing a second melt blending step. If any subsequent extrusion steps are needed, the composition from the second extrusion step can transferred then extruded again in the same or different extruder.

More preferably, the two-pass process is performed in at least a first melt blending of the two or more PP's, followed by cooling the melt blend to form strands, flakes, pellets, etc., then followed by a second melt blending process of the cooled blend. The "cooling" means that the temperature of the first extruded mixture, in whatever form, has cooled to at least the melting point of the lowest melting polypropylene, and preferably to at least 100, or 80, or 60, or 40, or 20° C.; or within a range from 100, or 80, or 60° C. to 40 or 20, or 10° C. If the first extruded mixture is cooled, such cooling can be effected by any means such as by exposure to ambient air, a blower of ambient air or cooled air across the first extruded mixture, and/or exposure to water at a desirable temperature. The second melt blending can take place in the same or different apparatus used in the first melt blending step. The conditions of the first and/or second melt blending can be the same or different as described herein. In subsequent steps, the second or more extruded mixture may or may not be "cooled".

Most preferably, the two-pass process comprises combining within the range from 5, or 10, or 15, or 20, or 25, or 30, or 35, or 40 wt % to 50, or 55, or 60, or 65 wt % (based upon weight of the combined components) of the HMW polypropylene within the range from 35, or 40, or 45, or 50 wt % to 60, or 65, or 70, or 75, or 80, or 85, or 90, or 95 wt % (based upon weight of the combined components) of the LMW polypropylene, where the difference in Mw between the HMW PP and the LMW PP (ΔMw) is at least 100,000, or 200,000, or 300,000 g/mol (or within a range from 100,000, or 200,000, or 300,000 g/mole to 400,000, or 500,000 g/mole), and melt blending in a first melt blending step the HMW and LMW components, where the extruder preferably has at least three temperature zones each independently at a melt temperature ($T_{melt}$) within the range from 140, or 150, or 160° C. to 170, or 180, or 190, or 200, or 210, or 220, or 230° C.; preferably cooling the blend produced in the first melt extrusion step to produce a solid blend. Next, this solid blend is introduced into the same or different melt blending apparatus and melt blending the solid blend a second time, where the melt blending apparatus preferably has at least three temperature zones each independently at a $T_{melt}$ within the range from 140, or 150, or 160° C. to 170, or 180, or 190, or 200° C.; and isolating or forming the blend produced in the second melt blending step to produce the bimodal polypropylene composition.

In any embodiment, the melt blending takes place in an extruder having a feeder zone (first 10% of the length of the extruder from the feeder where the polymer enters the extruder) and a die zone (last 10% of the length of the extruder before the point where the polymer exits the die), wherein a temperature gradient is provided from a feeder zone to a die zone of at least +5, or +10, or +20° C. In any embodiment, the melt blending takes place at a melt temperature ($T_{melt}$) within the range from 140, or 150, or 160° C. to 170, or 180, or 190, or 200° C. Preferably the $T_{melt}$ at the feeder zone is within a range from 140 to 180° C., and the $T_{melt}$ at the die zone is within a range from 160 to 200° C. Preferably, the extruder has at least three temperature zones where each is independently controllable within the temperature ranges described herein.

The inventive melt blended bPP's exhibit shear thinning even at relatively high shear rates. The Melt Viscosity (190° C., using SAOS) at 200 rad/sec model the shear thinning behavior of the polymer, and the ratio of the Melt Viscosity a zero frequency ($\eta_0$) and at 200 rad/sec (rum) give an indication of the shear thinning, where a higher ratio means there is more shear thinning. Thus, in any embodiment the inventive melt blended bPP's are extruded such that at a ratio of Complex Viscosities (190° C., SAOS) of zero shear $\eta_0$ and at a shear frequency of 200 rad/sec $\eta_{200}$ ($\eta_0/\eta_{200}$) of greater than 10, or 12, or 16, or 20 is exhibited, or a $\eta_0/\eta_{200}$ within a range from 10, or 12, or 16 to 20, or 30, or 40 is exhibited.

Advantageously, the processing of the bimodal polypropylenes to form pellets or articles is improved as compared to processing unimodal ZN polypropylenes (uZN) or even the homopolymer portion of most ZN impact copolymers (such as the homopolymer ZN (hZN) Controls described in the examples). This is evidenced in the similar Shear Viscosities that are exhibited by the inventive melt blended bPP's relative to unimoldal ZN PP's, especially as Shear Viscosities at 2500 l/sec, or more preferably 2500 l/sec and higher. Thus in any embodiment the melt blended bPP's are extruded such that they exhibit at a shear rate of 2500 l/sec the Shear Viscosity ($\eta_{2500}$, 190° C., using Capillary Rheology) of is less than 60, or 55, or 50, or 45 Pa·sec, or within the range from 5, or 10, or 20, or 30, or 35 Pa·sec to 45, or 50, or 55, or 60 Pa·sec at a shear rate of 2500 l/sec. Such a frequency approximates the processing performance of a polymer at rates suitable for such operations as injection molding and extrusion through a twin-screw extruder.

The inventive process described herein may include, in any embodiment, the further step of operations to make an article of manufacture. Such additional operations include thermoforming, injection molding, or blow molding articles from the bimodal polypropylene composition, wherein a foaming agent, such as physical and/or chemical blowing agents as is known in the art, may be present to effectuate forming a foamed article.

Further, at any time before or after melt blending, antioxidants, especially so called primary and secondary antioxidants, as well as alkyl radical scavengers, and acid scavengers can be added to the melt blended bPP or mixture of polymers used to make the melt blended bPP to within the range from 10, or 20, or 50 ppm to 400, or 600, or 1000, or 2000, or 3000 ppm for each.

The Bimodal Polypropylenes

The inventive process results in an inventive bPP, preferably melt blended bPP. The bPP compositions comprise (or consisting of, or consisting essentially of) at least two polypropylenes having a Flexural Modulus (190° C., 1% secant) of at least 1700 MPa, or as described herein, and any one or more of the following features:

(a) a melt flow rate ($MFR_{bPP}$, 230° C., 2.16 kg) within the range from 2, or 5, or 10, or 15 g/10 min to 80, or 100, or 120, or 140, or 160, or 180, or 200 g/10 min; and/or (b) a combined molecular weight distribution ($Mw_{bPP}/Mn_{bPP}$, $MWD_{bPP}$) within the range from 2.5, or 3.0, or 3.5, or 4.0, or 5.0 to 12.0, or 16.0, or 18.0, or 20.0, and/or (c) a ΔMw of at least 100,000, or 200,000 or 300,000 g/mole, or within a range from 100,000, or 200,000, or 300,000 g/mole to 400,000, or 500,000 g/mole.

More preferably, the inventive bPP's comprise a combination of at least one HMW and one LMW polypropylenes.

In any embodiment, the melt blended bPP's comprise (or consist of, or consist essentially of) within the range from 5, or 10, or 15, or 20, or 25, or 30, or 35, or 40 wt % to 50, or 55, or 60, or 65 wt % (based upon weight of the blend) of the HMW polypropylene; and within the range from 35, or 40, or 45, or 50 wt % to 60, or 65, or 70, or 75, or 80, or 85, or 90, or 95 wt % (based upon weight of the blend) of the LMW polypropylene.

Not readily knowing the molecular weight characteristics of the PP components of a blend, especially the ΔMw, the deconvolution of the GPC data from bimodal polypropylene compositions and subsequent mathematical fitting can allow for calculation of individual molecular weights of the components. The molecular weight properties as characterized by GPC can be described by a log Normal function in which the probability density function (PDF) is shown in Equation 1:

$$f(M) = \frac{dWt}{d\log M} = \frac{1}{\sqrt{2\pi}\,\sigma} e^{-\frac{1}{2}\left(\frac{\log(M/M_p)}{\sigma}\right)^2}, \quad (1)$$

where the peak width $\sigma$ and the peak molecular weight ($M_p$) are the parameters necessary for specific calculations. The weight averaged and number averaged molecular weights (Mw and Mn) can be derived from equation (1). The area under each peak corresponds to the mass fraction of each component. The Mw, and if desired, the Mn and Polydispersity Index (PDI) for each component is then calculated from the fitted Mp and $\sigma$ parameters in the corresponding peak with equations (2), (3) and (4). The curve fitting can be performed with software Igor Pro V6:

$$M_w = \frac{\int M dWt}{\int dWt} = \frac{\int M fd(\log M)}{\int fd(\log M)} = M_p e^{\frac{\ln^2 10}{2}\sigma^2} = M_p e^{2.651\sigma^2}, \quad (2)$$

$$M_n = \frac{\int dWt}{\int \frac{dWt}{M}} = \frac{\int fd(\log M)}{\int \frac{f}{M}d(\log M)} = M_p e^{-\frac{\ln^2 10}{2}\sigma^2} = M_p e^{-2.651\sigma^2}, \quad (3)$$

$$PDI = \frac{M_W}{M_n} = e^{\ln^2 10 \sigma^2} = e^{5.302\sigma^2}. \quad (4)$$

Particularly preferred bPP's comprise (or consist of, or consist essentially of) within the range from 40 to 70 wt %, by weight of the blend, of the LMW polypropylene, and within the range from 30 to 60 wt %, by weight of the blend, of the HMW polypropylene, wherein the LMW component has a Mw within a range from 100,000 to 300,000 g/mole and the HMW component has a Mw within the range from 300,000 to 600,000 g/mole. Such compositions demonstrate a particularly enhanced Flexural Modulus while maintaining good processability, which can be maintained over a range of MFR from, for example, 2, or 5 g/10 min to 100, or 200 g/10 min, or as described herein.

In any embodiment, the bPP comprises a HMW polypropylene having a weight average molecular weight (Mw) of 300,000, or 400,000 g/mole or more, and a MWD within the range from 2.0 to 4.5; and a LMW polypropylene having a weight average molecular weight (Mw) of 300,000, or 200,000 g/mole or less, and a MWD within the range from 2.0 to 4.5, wherein the difference in Mw between the HMW PP and the LMW PP is at least 100,000, or 200,000, or 300,000 g/mol, and the Flexural Modulus is greater than 1700 MPa, or as described herein.

In any embodiment, the combined weight average molecular weight ($Mw_{bPP}$) of the bPP is within a range from 100,000, or 150,000 g/mole to 250,000, or 300,000, or 350,000, or 400,000, or 450,000 g/mole. In any embodiment, the number average molecular weight ($Mn_{bPP}$) of the melt blended bPP is within a range from 10,000, or 20,000, or 25,000 g/mole to 35,000, or 40,000, or 50,000, or 55,000 g/mole. In any embodiment, the combined molecular weight distribution ($Mw_{bPP}/Mn_{bPP}$) of the melt blended bPP ($MWD_{bPP}$) is within the range from 2.5, or 3.0, or 3.5, or 4.0, or 5.0 to 12.0, or 16.0, or 18.0, or 20.0.

The melt blended bPP has certain DSC measured properties. In any embodiment, the melt blended bPP has a Heat Deflection Temperature (HDT) of greater than 95, or 98, or 100, or 102° C.; or within a range from 95 to 110° C. In any embodiment, the melt blended bPP has a melting point temperature $T_{m2}$ of less than 165, or 160° C., or within the range from 150, or 152° C. to 158, or 160, or 165° C.

In any embodiment, the bPP has a Flexural Modulus of at least 1700, or 1750, or 1900 MPa, or within the range from 1700, or 1750, or 1800 MPa to 1900, or 1950, or 2000, or 2500, or 3000 MPa, and this may apply throughout the range of MFR's and/or MWD's exhibited by the melt blended bPP's. Further, in any embodiment the Flexural Modulus is equal to or at least 5, or 10, or 15% greater than the HMW component Flexural Modulus alone, the LMW component Flexural Modulus alone, or the average of the two combined. This demonstrates a synergistic effect of the melt blending process and composition therefrom.

As mentioned above, the bPP's exhibit shear thinning even at relatively high shear rates. The Melt Viscosity (190° C., using SAOS) at 200 rad/sec model the shear thinning behavior of the polymer, and the ratio of the Melt Viscosity a zero frequency ($\eta_0$) and at 200 rad/sec ($\eta_{200}$) give an indication of the shear thinning, where a higher ratio means there is more shear thinning. Thus, in any embodiment the shear thinning behavior of the inventive melt blended bPP's manifest in a ratio of Complex Viscosities (190° C., SAOS) of zero shear $\eta_0$ and at a shear frequency of 200 rad/sec $\eta_{200}$ ($\eta_0/\eta_{200}$) of greater than 10, or 12, or 16, or 20, or within a range from 10, or 12, or 16 to 20, or 30, or 40.

Also, the bPP's can be characterized in the way they process to form articles of manufacture such as in injection and extrusion molding operations. This is evidenced in the similar Shear Viscosities that are exhibited by the inventive melt blended bPP's relative to unimoldal ZN PP's, especially as Shear Viscosities at 2500 l/sec, or more preferably 2500 l/sec and higher. Thus in any embodiment the melt blended bPP's exhibit at a shear rate of 2500 l/sec the Shear Viscosity ($\eta_{250}$, 190° C., using Capillary Rheology) of is less than 60, or 55, or 50, or 45 Pa·sec, or within the range from 5, or 10, or 20, or 30, or 35 Pa·sec to 45, or 50, or 55, or 60 Pa·sec at a shear rate of 2500 l/sec.

The bPP's may include, or be combined with, other desirable components that are useful in forming articles of manufacture. Such components include elastomeric polymers selected from the group consisting of styrenic block copolymers (e.g, Kraton™ polymers), ethylene-propylene elastomers and ethylene-propylene-diene terpolymers (e.g., Vistalon™ EPDM elastomers from ExxonMobil Chemical Company), ethylene-based plastomers (e.g., Exact™ plastomers from ExxonMobil Chemical Company), propylene-based elastomers (e.g., Vistamaxx™ performance polymers from ExxonMobil Chemical Company), propylene-based impact copolymers (e.g., PP7032, PP7684, PP7555 from ExxonMobil Chemical Company), composite elastomers such as thermoplastic vulcanizates (e.g., Santoprene™ TPVs) and combinations thereof. Such combined polymers (polypropylenes with at least one elastomer) are often referred to as thermoplastic polyolefin compositions, or impact copolymers. Such elastomeric polymers may be present with the melt blended bPP's within a range from 5, or 10, or 20 wt % to 50, or 60, or 70 wt %, for example. But in any embodiment, styrenic block copolymers, and any copolymer comprising styrenic-derived units, are absent from compositions comprising the melt blended bPP.

Other useful ingredients that can be combined with the inventive melt blended bPP's (or the polymers used to make the bPP's) include fillers such as talc, calcium carbonate, silica, alumina, mica, glass fibers, carbon fibers, titanium dioxide; and metal salts of an oxysulfate, aluminoxysulfate, aluminosilicate, silicate, borate, or combinations thereof any of which can have an aspect ratio from 1 to 10, or 20, or 100 or more. Such fillers may be present with the melt blended bPP's and/or melt blended bPP/elastomer blend within a range from 1, or 5, or 10, or 20 wt % to 50, or 60, or 70 wt %, for example.

In any embodiment, articles of manufacture can be formed from the melt blended bPP's disclosed herein, which may or may not include the other additives and components mentioned above. Desirable articles include thermoformed articles, injection molded articles, and/or blow molded articles, any of which may be foamed or non-foamed. Useful articles include automotive components, both interior and exterior, appliance components, and food containers such as cups, plates, and so-called "clamshell" food containers such as disclosed in U.S. Pat. No. 8,883,280, among many other articles.

The various descriptive elements and numerical ranges disclosed herein for the inventive process and bimodal polypropylenes can be combined with other descriptive elements and numerical ranges to describe the invention(s); further, for a given element, any upper numerical limit can be combined with any lower numerical limit described herein, including the examples in jurisdictions that allow such ranges. The features of the invention are demonstrated in the following non-limiting examples.

EXAMPLES

Compounding and Injection Molding

The bPP's (inventive) were formulated in an 18-mm Baker Perkins twin screw extruder. A standard additive package consisting of 1000 ppm Irganox™ 1010, 1000 ppm Ultranox™ 626-A (both antioxidants) and 300 ppm DHT-4V (magnesium aluminum hydroxide carbonate, an acid scavenger) was utilized in all compositions to prevent oxidation and maintain stability, and added to the polypropylene flakes/granules prior to the first extruder pass. The extruders were not kept under nitrogen, thus, exposed to atmospheric conditions. Compounding in the twin screw extruder was accomplished using an intense mixing screw element. The batch size was 1000 gms. The temperature profile in the various extruder zones was ramped progressively from 150° C. to 200° C., and the recorded "melt temperatures" listed in Tables 3 to 7 are temperatures measured using a thermocouple probe in the melt. The torque of the twin screws were typically between 45 and 80%, and the melt temperatures were typically between 170 and 220° C. as described in the tables of data below. Here and throughout the inventive examples the polypropylene blends are non-nucleated.

The composition ratios and the base materials ("HMW" and "LMW" polypropylenes) are listed in Table 1. The "ZN hPP Control" listings in Table 1 are the Ziegler-Natta produced polypropylene homopolymer portion of the listed commercial impact copolymer, thus excluding the elastomer portion, demonstrating commercial reactor blends of two polypropylenes. In these controls, there are two-reactors used to make the polypropylene homopolymer, but each has the same molecular weight (within the stated "MWD" in the table). The weight ratio of the two polypropylenes that make up these comparatives is within 40-60 wt % for each. Note that "HMW-2" could not be tested for its MFR at 2.16 kg, so 10 kg was used instead, and that value for the MFR ($MFR_{10}$) reported in Table 1.

As outlined in Tables 3 to 7, inventive Examples 101 to 112 were subjected to a second pass on the extruder to ensure homogeneity of the blends. After the first pass, the polypropylene blend was cooled to solidify into pellets. These pellets were then used in a second pass of the polymer through the same extruder, preferably at substantially the same temperature profile (within ±5° C.). The compounds discharged from the second pass of the extruder were again cooled and pelletized.

The "comparative" examples in Table 1 are the polypropylene homopolymer (hPP) portions of the named commercial impact copolymers. Table 2 includes other commercial polypropylene homopolymers made with Ziegler-Natta (ZN) and metallocene (MN) catalysts that are cited as comparative or reference examples in the figures.

To ensure that there was no significant degradation of the HMW and/or LMW polypropylenes used in these two-pass extrusions, comparable blends (to those in Table 1) were made using a solution blending process, and rheological curves obtained for these and the comparable two-pass extruded polypropylenes. It was found that the rheological curves fell on top of one another (thus indistinguishable), indicating no significant degradation of materials during extrusion.

Heat Deflection Temperature

The heat deflection temperatures (HDT) were measured according to ASTM D648, where the maximum surface stress applied to the sample was 0.46 MPa (66 psi). The heat deflection temperatures (HDT) for the comparative and inventive blends are listed in Table 1, and shown graphically in FIGS. 5 and 6. These data show that the inventive blends have the same or higher HDT as comparative ZN PP. The HDT is measured to within ±0.2° C.

Flexural Modulus

The 1% secant Flexural Modulus ("Flexural Modulus") was measured according to ASTM D790 at 190° C. Values of Flexural Modulus can be determined to within a standard deviation of from 5 to 55.

Melt Flow Rate (MFR)

MFR is defined in grams of polymer per 10 min (g/10 min or its equivalent unit dg/min) and was measured according to ASTM D1238 (2.16 kg, 230° C.). For reactor granule and/or powder PP samples that are not stabilized, the following sample preparation procedure is followed before measuring the MFR. A solution of butylated hydroxy toluene (BHT) in hexane is prepared by dissolving 40±1 grams of BHT into 4000±10 ml of hexane. Weigh 10±1 grams of the granule/powder PP sample into an aluminum weighing pan. Add 10±1 ml of the BHT/hexane solution into the aluminum pan under a hood. Stir the sample, if necessary, to thoroughly wet all the granules. Place the sample slurry in a vacuum oven at 105°±5° C. for a minimum of 20 min. Remove the sample from the oven and place in a nitrogen purged desiccator a minimum of 15 minutes allowing the sample to cool. Measure the MFR following ASTM D1238 procedure.

Melting Point Temperature ($T_{m2}$)

In any embodiment of the invention, the bimodal single site polypropylenes described herein may have a melting point (DSC second melt) as described below, and reported in Table 1. Melting temperature ($T_{m2}$) was measured using Differential Scanning calorimetry (DSC) using commercially available equipment such as a TA Instruments 2920 DSC. Typically, 6 to 10 mg of the sample, that has been stored at room temperature for at least 48 hours, is sealed in an aluminum pan and loaded into the instrument at room temperature. The sample is equilibrated at 25° C., then it is cooled at a cooling rate of 10° C./min to −80° C., to obtain heat of crystallization (Tc). The sample is held at −80° C. for 5 min and then heated at a heating rate of 10° C./min to 25° C. The glass transition temperature (Tg) is measured from the heating cycle. Otherwise, the sample is equilibrated at 25° C., then heated at a heating rate of 10° C./min to 150° C. The endothermic melting transition, if present, is analyzed for onset of transition and peak temperature. The melting temperatures reported ($T_{m2}$) are the peak melting temperatures from the second heat unless otherwise specified. For samples displaying multiple peaks, the melting point (or melting temperature) is defined to be the peak melting temperature (i.e., associated with the largest endothermic calorimetric response in that range of temperatures) from the DSC melting trace. The $T_{m2}$ is measured to within ±0.2° C.

Molecular Weight Characteristics

The molecular weight properties (Mw, Mn, Mw/Mn, etc.), were determined with a high temperature Gel Permeation Chromatography (PolymerChar GPC-IR) equipped with a multiple-channel band filter based Infrared detector ensemble IR5, in which a broad-band channel is used to measure the polymer concentration while two narrow-band channels were used for characterizing composition. Three Agilent PLgel 10 μm mixed-B LS columns were used to provide polymer separation. Aldrich reagent grade 1,2,4-trichlorobenzene (TCB) with 300 ppm antioxidant butylated hydroxytoluene (BHT) was used as the mobile phase. The TCB mixture was filtered through a 0.1 μm Teflon filter and degassed with an online degasser before entering the GPC instrument. The nominal flow rate was 1.0 mL/min and the nominal injection volume was 200 μL. The whole system including transfer lines, columns, detectors were contained in an oven maintained at 145° C. A given amount of polymer sample was weighed and sealed in a standard vial with 10 μL flow marker (heptane) added to it. After loading the vial in the autosampler, polymer was automatically dissolved in the instrument with 8 mL added TCB solvent. The polymer was dissolved at 160° C. with continuous shaking for about 1 hour for most PE samples or 2 hours for PP samples. The TCB densities used in concentration calculation were 1.463 g/ml at room temperature (22° C.) and 1.284 g/ml at 145° C. The sample solution concentration was from 0.2 to 2.0 mg/ml, with lower concentrations being used for higher molecular weight samples. The MWD values can be determined to ±0.05.

The concentration, c, at each point in the chromatogram was calculated from the baseline-subtracted IR5 broadband signal, I, using the following equation:

$$c = \alpha I$$

where α is the mass constant determined with PE or PP standards. The mass recovery is calculated from the ratio of the integrated area of the concentration chromatography over elution volume and the injection mass which is equal to the pre-determined concentration multiplied by injection loop volume.

The molecular weight was determined by combining the universal calibration relationship with the column calibration, which was performed with a series of monodispersed polystyrene (PS) standards. The MW was calculated at each elution volume with the following equation:

$$\log M_X = \frac{\log(K_X/K_{PS})}{a_X + 1} + \frac{a_{PS} + 1}{a_X + 1} \log M_{PS}$$

where the variables with subscript "X" stand for the test sample while those with subscript "PS" stand for "polystyrene" sample. In this method, $a_{PS}=0.67$ and $K_{PS}=0.000175$ while $a_X$ and $K_X$ were obtained from published literature. Specifically, a/K=0.695/0.000579 for polyethylene homopolymer and 0.705/0.0002288 for polypropylene homopolymer.

The comonomer composition was determined by the ratio of the IR detector intensity corresponding to CH2 and CH3 channel calibrated with a series of PE and PP homo/copolymer standards whose nominal value were predetermined by NMR or FTIR.

The universal calibration method was used for determining the molecular weight distribution (MWD, Mw/Mn) and molecular-weight averages (Mn, Mw, etc.) of eluting polymer fractions. Thirteen narrow molecular-weight distribution polystyrene standards (obtained from Polymer Labs, UK) within the range of 1.5-8200 kg/mol were used to generate a universal calibration curve. Mark-Houwink parameters were obtained from Appendix I of Mori, S.; Barth, H. G. Size Exclusion Chromatography, (Springer, 1999). For polystyrene K=1.38×10-4 dl/g and α=0.7; and for polyethylene K=5.05×10-4 dl/g and α=0.693 were used. For a polymer fraction, which eluted at a temperature step, that has a weight fraction (weight % recovery) of less than 0.5%, the MWD and the molecular weight averages were not computed; additionally, such polymer fractions were not included in computing the MWD and the molecular-weight averages of aggregates of fractions.

Small Angle Oscillatory Shear (SAOS) Rheology

Sample preparation for small amplitude oscillatory shear (SAOS) test is as follows. The specimen was compression molded from granules on hot press manufacture by LAB Tech Engineering Company Ltd. Granules were compressed at 190° C., 292 N for 8 min after 5 min preheat by using 1 mm thick molds with five 25 mm diameter cavities. Then specimens were water-cooled in 10 min to room temperature (23° C.).

SAOS Rheology Test.

SAOS Rheology test was tested on ARES-G2 Rheometer, produced by TA Instruments Co. Ltd. Specimens were loaded between parallel-plates geometry after ARES was preheated at 210° C. Specimen thickness was adjusted by the gap between upper and lower plates to about 1 mm. Strain sweep (SS) test was conducted before SAOS test on the same equipment to determine critical strain value from linear viscoelastic region. In SS test, specimen was tested at 210° C. with 25 mm diameter parallel plates geometry at angular frequency (ω)=1.0 rad/s, strain ($\dot{\gamma}$)=1% to 10%. Then SAOS test was conducted at 210°, 195°, 180°, 165°, 150° and 135° C., respectively. Strain ($\dot{\gamma}$) was kept low (<10%) to test within the linear viscoelastic region according to SS result. Frequency was varied between 100 rad/s and 0.1 rad/s with 5 points per decade. All tests were carried in a nitrogen atmosphere to avoid oxidative degradation.

Time Temperature Superposition (TTS).

TTS is used to describe the relaxation of polymer chains at high temperature that can be achieved at low temperature as long as it is given a long enough time to relax. By this method temperature dependent flow behavior can be transformed into frequency dependent behavior, thus the frequency regime of studied material is expanded (see Van Gurp, M. et al. 67(1) Rheol. Bull. 5-8 (1998)). TTS was performed using the software TRIOS provided by TA Instruments Co. Ltd. When starting the TTS function, the reference temperature was set to 165° C. in this study. Plots of complex viscosity ($\eta^*$) against angular frequency ($\omega$) curves at different temperatures were shifted horizontally to an overlaid master curve. Activation energy was calculated from shifting factors fitted by Arrhenius equation (see Vega, J. F., et al. 31(11) Macromolecules 3639-3647 (1998)):

$$a_T = \exp\left[\frac{E_a}{R}\left(\frac{1}{T} - \frac{1}{T_r}\right)\right]$$

where $a_T$ is horizontal shifting factor, R is the Universal gas constant, Ea is flow activation energy, T is testing temperature in Kelvin degree, $T_r$ is reference temperature in Kelvin degree. The master curve was shifted to 190° C. after the activation energy is calculated. Then it is transformed into master curve of shear viscosity ($\eta$) against shear rate ($\dot{\gamma}$) according to Cox-Merz rule: $\eta(\dot{\gamma}) = \eta^*(\omega)$ when $\dot{\gamma} = \omega$.

Calculation of Master Curve.

Zero shear viscosity, relaxation time and power law index were calculated from master curve by curve fitting to Cross Model (see Rao, M. A. in Food Engineering Series: Rheology of Fluid, semisolid, and solid foods, (Springer, US, 3rd ed. 2014)):

$$(\eta - \eta_i)/(\eta_o - \eta_i) = 1/(1 + k\dot{\gamma})^n$$

wherein $\eta_o$ is zero shear viscosity (Pa·s); k is relaxation time (s); n is the (−1) power law index; and $\eta_i$ is infinite viscosity (Pa·s), which is equal to zero in this study. These parameters are used to evaluate shear thinning behavior of polymer melt. The first plateau in a plot of Log (apparent viscosity) as a function of Log (shear rate), which is a reversed S-shaped curve, in the low shear rate region is a Newtonian plateau where viscosity is independent to shear rate. The corresponding viscosity is $\eta_o$. In this region, the polymer chains are entangled and resistant to shear flow since there is only little rearrangement of polymer chain. Then a shear thinning region is observed that viscosity is decreased with shear rate, indicating polymer chains begin to orient and disentangle at the flow direction. When shear rate is high enough, second Newtonian plateau related to $\eta_1$ appears, where polymer chains undergo full orientation along shear direction. The second Newtonian region is barely observed in polymer melts, therefore $\eta_i$ is set to zero by default for all unimodal and bimodal PP.

These data, reported as the Melt Viscosity at 200 rad/sec, model the shear thinning behavior of the polymer, and the ratio of the Melt Viscosity a zero frequency and at 200 rad/sec give an indication of the shear thinning, where a higher ratio means there is more shear thinning. Table 8 give the Cross-fit parameters and Tables 9 to 12 show the data collected on an inventive bimodal PP and some comparative data, and Table 13 is a summary of the zero shear, shear at 200 rad/sec, and ratio of shear rates. A higher ratio suggests more shear thinning.

Bimodal composition is proved to be efficient in enhancing processablity. The high molecule weight portion will provide high melt strength while low molecule portion will help to disentangle the polymer chain when shear rate is increased, therefore shear thinning is improved. Catalyst effort had been made in bimodal polyolefins (see Ahn, Tae Oan, et al. 39(7) Polymer Engineering and Science 1257 (1999); and Shan, Colin Li Pi et al. 44(1) Polymer 177-185 (2003)) in controlling the molecular weight distribution in a bimodal pattern, result in more apparent shear thinning.

Capillary Rheology

Capillary rheology of the polymers was conducted on an ARC 2 rheometer at 200° C. using a 1 mm die with a path length of 30 mm. The test conditions were reproduced according to ASTM D3835, Standard Test Method for Determination of Properties of Polymeric Materials by Means of a Capillary Rheometer. The Rabinowitch corrected (R-C, B. Rabinowitsch, A145 Z. Physik. Chem. 1 (1929)) shear viscosity data is shown in Table 14, and FIG. 6. These data, reported as the Melt Viscosity at 2500 l/sec represent a "model" of shear conditions the polymer would see in processing such as in injection molding.

TABLE 1

Unimodal, Comparative Bimodal, and Inventive SS Bimodal non-nucleated Melt Blended Polypropylenes

| Sample Name | Description of PP | Blend Ratios (wt %) | MFR (2.16 kg, 230° C.) | Flexural Modulus, MPa | Flexural Modulus, Std Dev | Mw, g/mole | Mn, g/mole | Mw/Mn | Tm₂ | HDT, ° C. |
|---|---|---|---|---|---|---|---|---|---|---|
| HMW-1 | SS Unimodal | — | 0.9 | 1415 | 8.4 | 434,296 | 157,042 | 2.69 | 156.3 | 98.7 |
| HMW-2 | SS Unimodal | — | 2.6 (10 kg) | 1820 | 25.2 | 921,861 | 343,993 | 2.68 | 156.3 | 109.3 |
| LMW-1 | SS Unimodal | — | 35 | 1432 | 5.8 | 204,349 | 51,479 | 3.96 | 155.1 | 97.2 |
| LMW-2 | SS Unimodal | — | 1550 | 1494 | 54 | 62,130 | 25,270 | 2.46 | 154.2 | ND |
| 101 | SS Melt Blended Bimodal | 33% HMW-2 + 67% LMW-2 | 20.8 | 1830 | 26.5 | 418,978 | 33,488 | 12.51 | 158.5 | 101.8 |
| 102 | SS Melt Blended Bimodal | 26% HMW-2 + 74% LMW-2 | 127 | 1820 | 17.2 | 293,588 | 27,586 | 10.64 | 156.7 | 103.2 |
| 103 | SS Melt Blended Bimodal | 23% HMW-2 + 77% LMW-2 | 186 | 1780 | 38.6 | 248,609 | 25,249 | 9.85 | 156.6 | 105.1 |
| 104 | SS Melt Blended Bimodal | 9% HMW-1 + 91% LMW-1 | 22.6 | 1610 | 11.6 | 198,929 | 39,611 | 5.02 | 156.4 | 99.1 |
| 105 | SS Melt Blended Bimodal | 53% HMW-1 + 47% LMW-2 | 17 | 1750 | 28.1 | 229,479 | 37,730 | 6.08 | 156.8 | 102.1 |

TABLE 1-continued

Unimodal, Comparative Bimodal, and Inventive SS Bimodal non-nucleated Melt Blended Polypropylenes

| Sample Name | Description of PP | Blend Ratios (wt %) | MFR (2.16 kg, 230° C.) | Flexural Modulus, MPa | Flexural Modulus, Std Dev | Mw, g/mole | Mn, g/mole | Mw/Mn | $Tm_2$ | HDT, ° C. |
|---|---|---|---|---|---|---|---|---|---|---|
| 106 | SS Melt Blended Bimodal | 49% HMW-1 + 51% LMW-2 | 22.7 | 1730 | 17 | 214,452 | 41,214 | 5.20 | 157.0 | 102.0 |
| 107 | SS Melt Blended Bimodal | 46% HMW-1 + 54% LMW-2 | 28.5 | 1750 | 7.3 | 204,185 | 39,526 | 5.17 | 156.7 | 104.9 |
| 108 | SS Melt Blended Bimodal | 44% HMW-1 + 56% LMW-2 | 34.7 | 1760 | 18.1 | 198,704 | 33,460 | 5.94 | 156.7 | 102.7 |
| 109 | SS Melt Blended Bimodal | 42% HMW-1 + 58% LMW-2 | 42.5 | 1750 | 8.3 | 189,689 | 32,940 | 5.76 | 156.4 | 103.7 |
| 110 | SS Melt Blended Bimodal | 40% HMW-1 + 60% LMW-2 | 47.4 | 1770 | 17.8 | 184,793 | 32,435 | 5.70 | 156.6 | 103.4 |
| 111 | SS Melt Blended Bimodal | 38% HMW-1 + 62% LMW | 58 | 1780 | 2.3 | 178,908 | 32,119 | 5.57 | 156.6 | 105.1 |
| 112 | SS Melt Blended Bimodal | 37% HMW-1 + 63% LMW-2 | 60 | 1770 | 8.1 | 136,576 | 37,490 | 5.00 | 156.4 | 104.1 |
| ZN hPP-1 | ZN hPP Control | N/A | 9.9 | 1670 | 20.1 | 281,767 | 59,781 | 4.71 | 166.6 | 89.0 |
| ZN hPP-2 | ZN hPP Control | N/A | 15.5 | 1720 | 20.2 | 254,833 | 59,759 | 4.26 | 165.9 | 90.0 |
| ZN hPP-3 | ZN hPP Control | N/A | 52.2 | 1700 | 18.2 | 154,437 | 40,672 | 3.80 | 163.5 | 96.0 |
| ZN hPP-4 | ZN hPP Control | N/A | 203.2 | 1720 | 18.1 | 119,379 | 34,557 | 4.13 | 163.9 | 100.0 |
| ZN hPP-5 | ZN hPP Control | N/A | 66.9 | 1790 | 14.2 | 150,498 | 28,872 | 4.36 | 163.3 | 98.0 |

Figure 4:
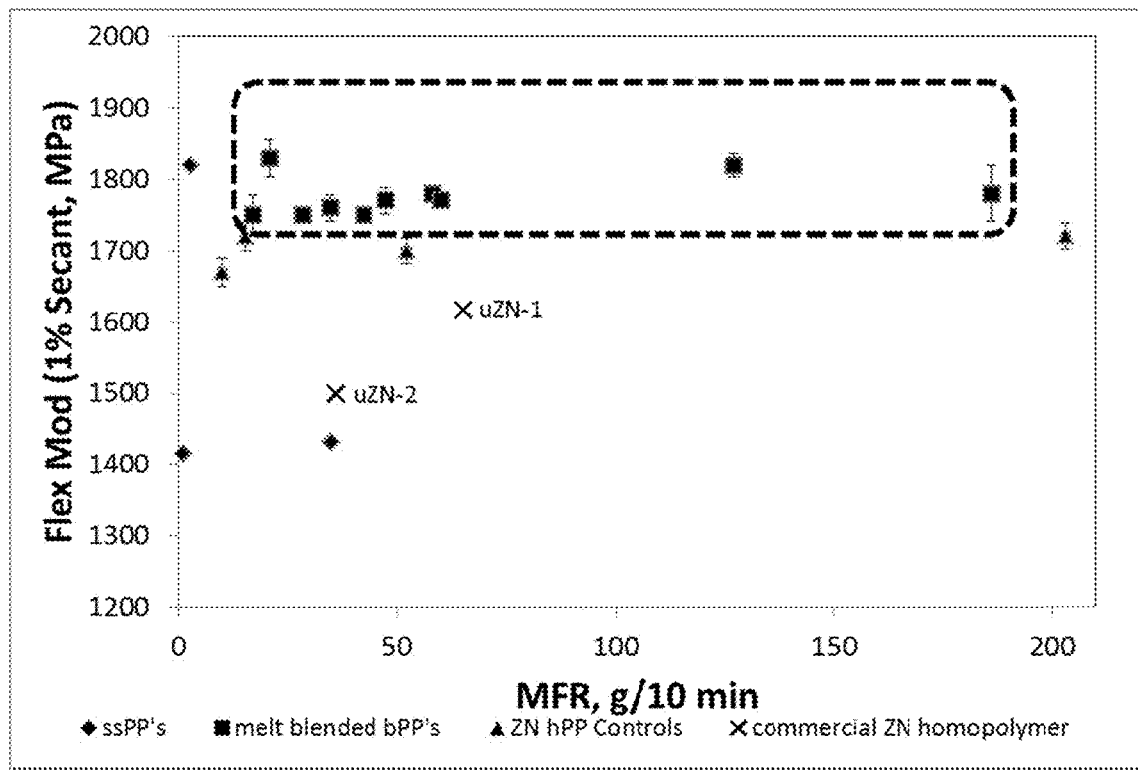
FIG. 4 is a plot of the 1% Flexural Modulus (MPa) vs. MFR for melt blended bPP's, ssPP's, and ZN hPP Controls.

The results of melt blending experiments in Table 1 demonstrate not only the benefit of blending a HMW and LMW polypropylene for purposes of broadening the MWD, but also an unexpected synergy in blending the components. In particular, in comparing the blends 104 to 112, one can see that the Flexural Modulus is actually higher than the individual Flexural Modulus of the HMW component (the component with the highest individual Flexural Modulus). This feature is demonstrated graphically in FIG. 4. In particular, if the combination of the LMW and HMW polypropylenes had a purely additive or subtractive Flexural Modulus effect, the plot of Flexural Modulus as a function of the LMW wt % would be a straight line as indicated by the dotted line. But the inventors surprisingly find that that is not the case, and in particular, when the amount of LMW is within a range of 40 to 70 wt % (the HMW being the remainder of the blend) the Flexural Modulus is at least 5, or 10, or 15% higher than expected.

Also, for the first group of single-site melt blended bimodal PP's, 101 to 103, in comparison when starting from non-processable (MFR, 2.6 at 10 kg, and MFR 1550) polypropylene (MFR of less than 1 g/10 min), the melt blending process can deliver processable (MFR of 20 to 200) bimodal PP's, especially those made with isotactic polypropylenes, without compromising the stiffness (Flexural Modulus). This is demonstrated graphically in FIG. 4 (data from Table 1). Even for the blends 101 to 103, there is no diminution of the Flexural Modulus upon blending the LMW with the HMW, and the benefit is that the very high molecular weight HMW component is now processable, where alone the HMW component in blends 101 to 103 would not be processable. The MFR regime from 20 to 200 g/10 min is of interest to all PP markets, namely, high melt strength polypropylenes, impact copolymers, blown films, etc.

TABLE 2

Properties of some comparative unimodal polypropylenes from the Figures

| Name | Description of PP | MFR, g/10 min | Flexural Modulus, MPa | Mw, g/mole | Mn, g/mole | Mw/Mn | $T_{m2}$ | HDT, ° C. |
|---|---|---|---|---|---|---|---|---|
| uZN-1 | Commercial ZN homopolymer | 65 | 1618 | 156,475 | 32,728 | 4.78 | 163.2 | 89.4 |
| uZN-2 | Commercial ZN homopolymer | 36 | 1500 | 179,666 | 46,633 | 3.85 | 159.69 | 106 |
| uMN-1 | Commercial MN homopolymer (ssPP) | 25 | 1270 | 175,950 | 81,987 | 2.2 | 149.0 | 90 |
| uMN-2 | Commercial MN homopolymer (ssPP) | 32 | 1350 | 166,282 | 68,736 | 2.4 | 149.0 | 92 |

TABLE 3

Extruder Conditions for inventive blends process
Melt Temperature (° C.)

| | 101 | 101 $2^{nd}$ pass | 102 | 102 $2^{nd}$ pass | 103 | 103 $2^{nd}$ pass |
|---|---|---|---|---|---|---|
| Feed Zone | 126 | 131 | 126 | 134 | 124 | 133 |
| Zone 2 | 155 | 157 | 156 | 157 | 155 | 157 |
| Zone 3 | 159 | 160 | 159 | 160 | 159 | 160 |
| Zone 4 | 160 | 160 | 160 | 160 | 161 | 160 |
| Zone 5 | 162 | 163 | 162 | 163 | 163 | 163 |

TABLE 3-continued

Extruder Conditions for inventive blends process

Melt Temperature (° C.)

| | 101 | 101 2$^{nd}$ pass | 102 | 102 2$^{nd}$ pass | 103 | 103 2$^{nd}$ pass |
|---|---|---|---|---|---|---|
| Zone 6 | 168 | 169 | 166 | 167 | 167 | 168 |
| Die | 166 | 170 | 169 | 168 | 167 | 168 |
| Typical Melt Temperature (Not Input) | 176 | 181 | 179 | 178 | 177 | 179 |
| Other Settings | | | | | | |
| Screw RPM | 152 | 152 | 149 | 152 | 155 | 152 |
| Feeder Setting | 500 | 400 | 600 | 400 | 600 | 400 |
| Throughput (lbs/hr) | — | — | — | — | — | — |
| % Torque | 50 | 58 | 57 | 54 | 49 | 51 |
| Die Pressure (psi) | 65 | 143 | 75 | 77 | 60 | 50 |

TABLE 4

Extruder Conditions for inventive blends, two-pass process

Melt Temperature (° C.)

| | 104 | 104 2$^{nd}$ pass | 105 | 105 2$^{nd}$ pass |
|---|---|---|---|---|
| Feed Zone | 151 | 134 | 128 | 131 |
| Zone 2 | 188 | 157 | 156 | 158 |
| Zone 3 | 193 | 160 | 160 | 161 |
| Zone 4 | 196 | 163 | 163 | 161 |
| Zone 5 | 196 | 168 | 168 | 166 |
| Zone 6 | 201 | 176 | 174 | 173 |
| Die | 204 | 177 | 177 | 172 |
| Typical Melt Temperature (Not Input) | 216 | 187 | 187 | 181 |
| Other Settings | | | | |
| Screw RPM | 155 | 155 | 156 | 156 |
| Feeder Setting | 300 | 350 | 530 | 410 |
| Throughput (lbs/hr) | 8.00 | 10.50 | 15.00 | — |
| % Torque | 46 | 75 | 68 | 68 |
| Die Pressure (psi) | 109 | 202 | 252 | 182 |

TABLE 5

Extruder Conditions for inventive blends, two-pass process

Melt Temperature (° C.)

| | 106 | 106 2$^{nd}$ pass | 107 | 107 2$^{nd}$ pass |
|---|---|---|---|---|
| Feed Zone | 130 | 133 | 131 | 133 |
| Zone 2 | 156 | 158 | 155 | 158 |
| Zone 3 | 159 | 161 | 159 | 161 |
| Zone 4 | 160 | 160 | 160 | 160 |
| Zone 5 | 165 | 165 | 164 | 163 |
| Zone 6 | 170 | 171 | 170 | 168 |
| Die | 171 | 171 | 170 | 168 |
| Typical Melt Temperature (Not Input) | 181 | 181 | 179 | 178 |
| Other Settings | | | | |
| Screw RPM | 156 | 159 | 155 | 159 |
| Feeder Setting | 600 | 320 | 600 | 330 |
| Throughput (lbs/hr) | 15.60 | — | 16.80 | — |
| % Torque | 64 | 54 | 69 | 57 |
| Die Pressure (psi) | 178 | 144 | 178 | 133 |

TABLE 6

Extruder Conditions for inventive blends, two-pass process

Melt Temperature (° C.)

| | 108 | 108 2$^{nd}$ pass | 109 | 109 2$^{nd}$ pass |
|---|---|---|---|---|
| Feed Zone | 132 | 137 | 129 | 135 |
| Zone 2 | 156 | 158 | 156 | 158 |
| Zone 3 | 159 | 160 | 160 | 160 |
| Zone 4 | 160 | 160 | 160 | 160 |
| Zone 5 | 163 | 163 | 163 | 163 |
| Zone 6 | 168 | 163 | 166 | 162 |
| Die | 171 | 168 | 168 | 168 |
| Typical Melt Temperature (Not Input) | 179 | 178 | 179 | 179 |
| Other Settings | | | | |
| Screw RPM | 155 | 159 | 156 | 159 |
| Feeder Setting | 600 | 330 | 650 | 320 |
| Throughput (lbs/hr) | 15.96 | — | 17.10 | — |
| % Torque | 64 | 53 | 63 | 50 |
| Die Pressure (psi) | 156 | 113 | 103 | 104 |

TABLE 7

Extruder Conditions for inventive blends, two-pass process

Melt Temperature (° C.)

| | 110 | 110 2nd pass | 111 | 111 2nd pass |
|---|---|---|---|---|
| Feed Zone | 133 | 131 | 129 | 132 |
| Zone 2 | 156 | 158 | 159 | 158 |
| Zone 3 | 159 | 161 | 159 | 160 |
| Zone 4 | 159 | 160 | 161 | 160 |
| Zone 5 | 163 | 162 | 162 | 163 |
| Zone 6 | 167 | 166 | 164 | 163 |
| Die | 171 | 171 | 167 | 169 |
| Typical Melt Temperature (Not Input) | 178 | 178 | 178 | 179 |
| Other Settings | | | | |
| Screw RPM | 156 | 159 | 152 | 152 |
| Feeder Setting | 600 | 330 | 620 | 380 |
| Throughput (lbs/hr) | 16.50 | — | 17.40 | — |
| % Torque | 60 | 51 | 68 | 56 |
| Die Pressure (psi) | 126 | 86 | 107 | 96 |

Complex Viscosities.

Figure 5:
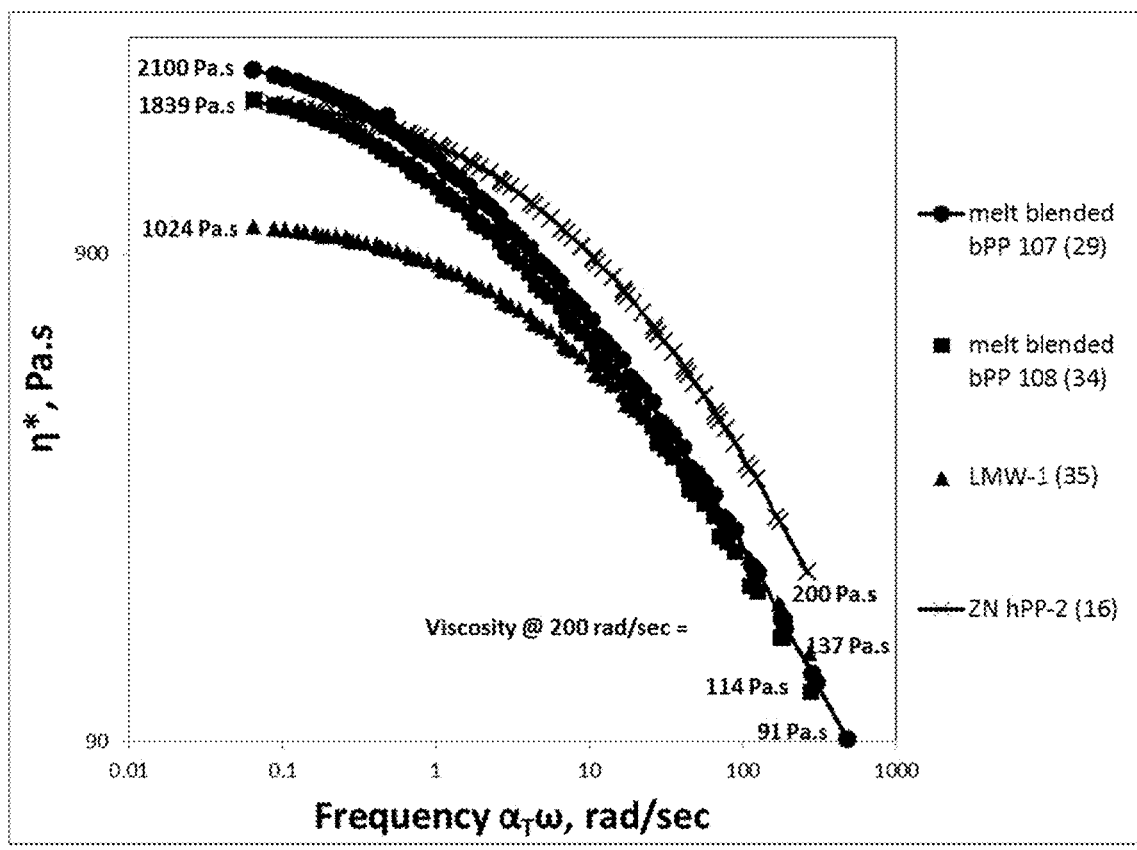
FIG. 5 is a plot of the Small Angle Oscillatory Shear (SAOS) frequency sweep on melt blended bPPs, ssPP's and ZN hPP Controls.

Data in Table 8 are Cross-fit parameters calculated from the SAOS experiments summarized in Tables 9 to 12, and plotted as shown in FIG. 5. Data is Time-Temperature Superpositioned (TTS) to 190° C.; the numbers in parenthesis are the rounded MFR values from Table 1. The differences in complex viscosities at zero shear and high shear exemplify the advantages of the inventive process and composition. The Complex Viscosity values are those extrapolated to zero shear frequency ($\eta_o$) which represent the static viscosity or stiffness of the polymer, $\eta_{200}$ are values at 200 rad/sec frequency which represents shear rates demonstrating shear thinning at higher values. FIG. 5 is a plot of the SAOS-derived Complex Viscosity ($\eta$) versus frequency for two inventive melt blended bPPs, a ZN hPP Control (ZN hPP-2), and a ssPP (LMW-1), where the theoretical $\eta$ value (y-value) when frequency is approaching zero (x value of 0) is $\eta_0$. The data in Tables 9 to 12, and FIG. 5, demonstrate that at high shear frequencies ($\eta_{200}$, or at 200 rad/sec, or 200 rad/sec and higher), the inventive melt blended bPP's 107 and 108 (29 and 34 MFR) have more shear thinning the ZN hPP-2 (16 MFR) at the same frequency and nearly the same MFR, but at low shear frequencies ($\eta_0$) the inventive melt blended bPP's behave similar to the ZN hPP-2, which translates to similar stiffness when static. Thus, the ratio of the $\eta_0/\eta_{200}$ is high for the inventive melt blended bPP's compared to the ZN hPP Control and ssPP. The fact that the melt blended bPP's are advantaged over the reactor blended homopolymers of the ZN hPP Control is indicative of an unexpected benefit to the way in which the melt blended bPP's are made, and the selection of ssPP components used to make the melt blended bPP.

Shear Viscosities.

Figure 6:
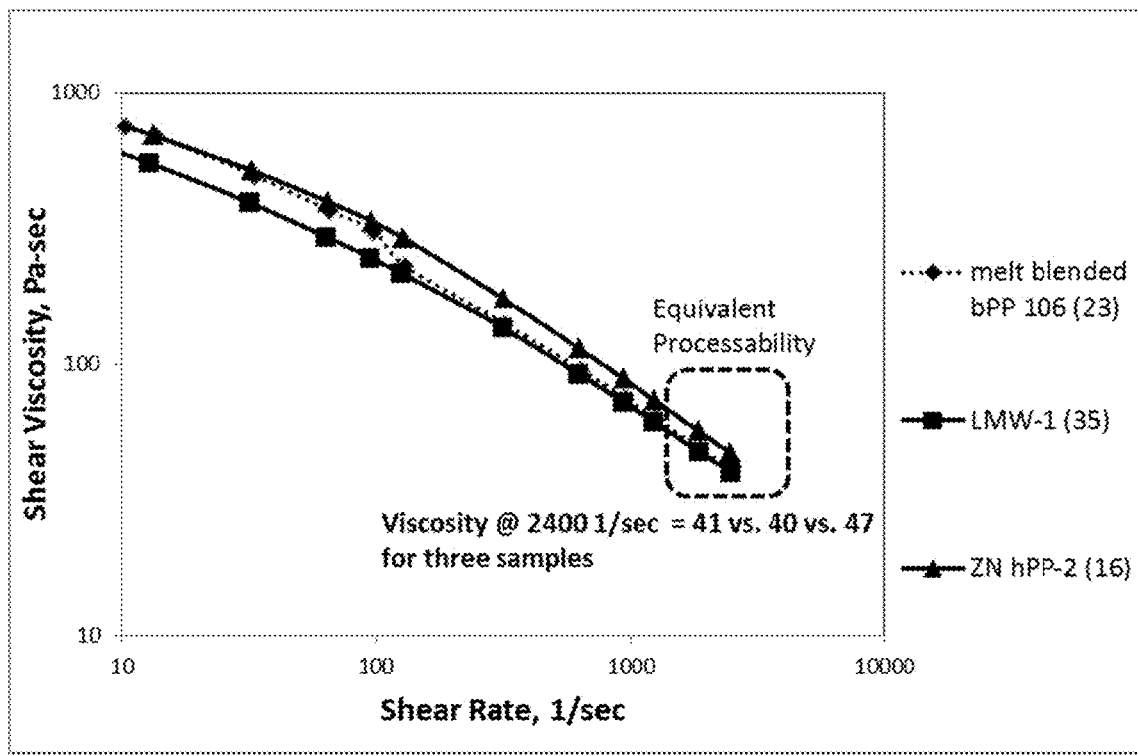
FIG. 6 is a plot of the Capillary rheology strain sweep on melt blended PP's, ssPP's, and ZN hPP Controls.
Figure 7:
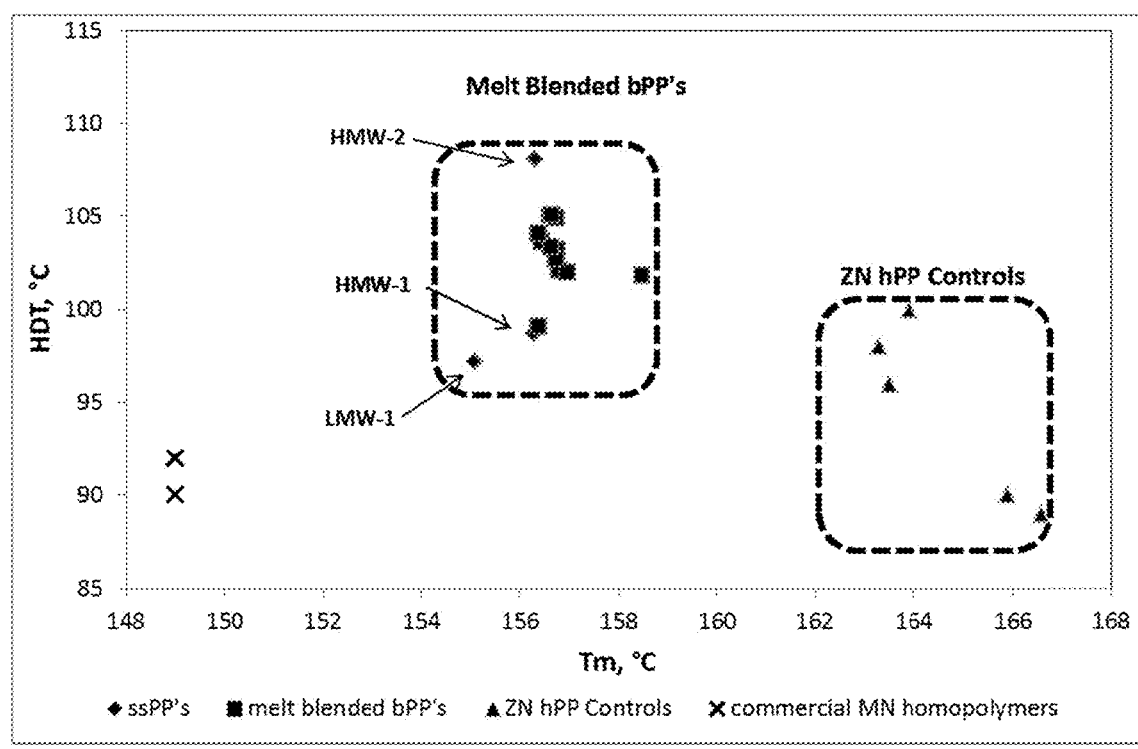
FIG. 7 is a plot of the HDTs vs. melting point temperatures ($T_m$) of melt blended bPP's, ZN hPP Controls, and ssPP's.

Likewise, the Shear Viscosities determined by Capillary Rheology demonstrate an advantage to the inventions. The numbers in parenthesis are the rounded MFR values from Table 1. The similarities in the high shear viscosities exemplify the advantages of the inventive process and composition. The Shear Viscosity values at 2500 l/sec ($\eta_{2500}$) from Capillary Rheology data summarized in Table 14 represents shear rates at a level of typical processing of the polymers such as by injection molding. FIG. 6 is a plot of the Capillary Rheology-derived Shear Viscosity versus rate. Those data demonstrate that there are only minor differences at high shear rates between the processing of ZN hPP Controls (ZN hPP-2), the LMW-1 single-site PP, and the inventive melt blended bPP 106. The Shear Viscosities ($\eta_{2500}$) are 47 Pa·sec for the ZN hPP-2 and 41 for the 23 MFR melt blended bPP 106. The inventive process produces melt blended bPP's that have nearly equivalent processability compared to ssPP and ZN hPP Control. This is inferred from the similar viscosities at 2500 l/sec by Capillary Rheology. Such equivalent viscosities at high shear rates reproduced processing environments encountered when processing polypropylenes. Stated another way, the inventive melt blended bPP's have a $\eta_{2500}$ ratio (ZN hPP Control/melt blended bPP, or unimodal ssPP/melt blended bPP) within a range from 1.0 to 1.2 (for polypropylenes having an MFR within 0-20 g/mole of one another and both having an MFR of at least 10 g/10 min).

TABLE 8

SAOS Cross Fit Parameters

| Sample Name (rounded MFR) | Cross parameter | | | Arrhenius Ea (kJ/mol) |
|---|---|---|---|---|
| | $\eta_0$ (Pa·s) | K (s) | 1 − n | |
| ZN hPP-2 (16) | 1930 | 0.1254 | 0.6043 | 38.81 |
| bPP 107 (29) | 2480 | 0.6248 | 0.5621 | 43.27 |
| bPP 108 (34) | 2170 | 0.6029 | 0.5546 | 41.01 |
| LMW-1 (35) | 1090 | 0.1071 | 0.5666 | 40.14 |

TABLE 9

SAOS Data of ZN hPP-2 at 190° C.

| ω rad/s | G' Pa | G" Pa | tan δ | η* Pa·s | Curve fit ω rad/s | Curve fit η* Pa·s |
|---|---|---|---|---|---|---|
| 0.067 | 7.6 | 122.5 | 16.14 | 1839.4 | 0.0010 | 1.92E+03 |
| 0.089 | 11.8 | 161.8 | 13.76 | 1816.8 | 0.0013 | 1.92E+03 |
| 0.106 | 15.2 | 190.9 | 12.53 | 1811.3 | 0.0016 | 1.92E+03 |
| 0.12 | 19.1 | 219.7 | 11.53 | 1791.9 | 0.0020 | 1.92E+03 |
| 0.14 | 23.7 | 251.2 | 10.60 | 1783.1 | 0.0025 | 1.92E+03 |
| 0.17 | 30.3 | 295.2 | 9.75 | 1771.5 | 0.0032 | 1.92E+03 |
| 0.18 | 33.1 | 308.8 | 9.34 | 1755.5 | 0.0040 | 1.91E+03 |
| 0.20 | 37.9 | 339.6 | 8.97 | 1752.8 | 0.0050 | 1.91E+03 |
| 0.22 | 46.4 | 387.2 | 8.34 | 1738.7 | 0.0063 | 1.91E+03 |
| 0.27 | 58.8 | 453.5 | 7.72 | 1722.1 | 0.0079 | 1.90E+03 |
| 0.27 | 60.3 | 452.4 | 7.51 | 1714.6 | 0.010 | 1.90E+03 |
| 0.28 | 64.1 | 474.1 | 7.40 | 1706.1 | 0.013 | 1.89E+03 |
| 0.31 | 73.54 | 520.1 | 7.07 | 1699.6 | 0.016 | 1.89E+03 |
| 0.36 | 88.90 | 591.6 | 6.66 | 1682.9 | 0.020 | 1.88E+03 |
| 0.42 | 112.4 | 689.7 | 6.14 | 1660.4 | 0.025 | 1.87E+03 |
| 0.42 | 114.4 | 687.1 | 6.01 | 1651.4 | 0.032 | 1.87E+03 |
| 0.44 | 121.9 | 719.9 | 5.91 | 1642.9 | 0.040 | 1.86E+03 |
| 0.49 | 138.9 | 787.6 | 5.67 | 1632.6 | 0.050 | 1.85E+03 |
| 0.56 | 166.9 | 892.6 | 5.35 | 1611.9 | 0.063 | 1.83E+03 |
| 0.67 | 208.1 | 1036.2 | 4.98 | 1584.6 | 0.079 | 1.82E+03 |
| 0.67 | 212.2 | 1031.8 | 4.86 | 1575.6 | 0.10 | 1.80E+03 |
| 0.70 | 224.5 | 1078.8 | 4.81 | 1564.4 | 0.13 | 1.79E+03 |
| 0.78 | 255.5 | 1176.7 | 4.61 | 1551.0 | 0.16 | 1.77E+03 |
| 0.89 | 304.3 | 1328.8 | 4.37 | 1526.7 | 0.20 | 1.74E+03 |
| 1.06 | 376.1 | 1534.3 | 4.08 | 1494.4 | 0.25 | 1.72E+03 |
| 1.06 | 381.7 | 1527.1 | 4.00 | 1485.6 | 0.32 | 1.69E+03 |
| 1.12 | 404.6 | 1593.3 | 3.94 | 1472.6 | 0.40 | 1.66E+03 |
| 1.23 | 456.5 | 1733.3 | 3.80 | 1456.8 | 0.50 | 1.63E+03 |
| 1.42 | 540.5 | 1946.8 | 3.60 | 1427.8 | 0.63 | 1.59E+03 |
| 1.68 | 660.5 | 2234.7 | 3.38 | 1390.9 | 0.79 | 1.55E+03 |
| 1.68 | 666.8 | 2220.9 | 3.33 | 1380.8 | 1.0 | 1.50E+03 |
| 1.77 | 706.7 | 2313.9 | 3.27 | 1367.5 | 1.3 | 1.46E+03 |
| 1.95 | 792.2 | 2510.0 | 3.17 | 1349.7 | 1.6 | 1.40E+03 |
| 2.24 | 929.3 | 2804.6 | 3.02 | 1317.3 | 2.0 | 1.35E+03 |
| 2.66 | 1115.9 | 3190.3 | 2.86 | 1272.9 | 2.5 | 1.29E+03 |
| 2.66 | 1133.6 | 3166.8 | 2.80 | 1263.8 | 3.1 | 1.23E+03 |
| 2.80 | 1195.9 | 3299.3 | 2.76 | 1251.5 | 4.0 | 1.17E+03 |
| 3.09 | 1332.6 | 3562.0 | 2.67 | 1230.5 | 5.0 | 1.10E+03 |
| 3.56 | 1536.3 | 3950.8 | 2.57 | 1192.5 | 6.3 | 1.03E+03 |
| 4.21 | 1835.6 | 4466.7 | 2.43 | 1147.5 | 7.9 | 9.67E+02 |
| 4.21 | 1862.6 | 4437.5 | 2.38 | 1140.9 | 10.0 | 9.00E+02 |
| 4.44 | 1959.3 | 4607.1 | 2.35 | 1126.5 | 12.6 | 8.34E+02 |
| 4.90 | 2153.9 | 4942.8 | 2.30 | 1100.8 | 15.8 | 7.68E+02 |
| 5.63 | 2476.2 | 5455.8 | 2.20 | 1063.5 | 20.0 | 7.05E+02 |
| 6.67 | 2924.9 | 6116.3 | 2.09 | 1016.5 | 25.1 | 6.44E+02 |
| 6.69 | 2965.6 | 6060.7 | 2.04 | 1009.3 | 31.6 | 5.86E+02 |
| 7.04 | 3086.6 | 6278.5 | 2.03 | 993.3 | 39.8 | 5.31E+02 |
| 7.76 | 3393.6 | 6716.3 | 1.98 | 969.3 | 50.1 | 4.79E+02 |
| 8.93 | 3869.2 | 7368.7 | 1.91 | 932.1 | 63.1 | 4.30E+02 |
| 10.57 | 4523.4 | 8199.7 | 1.81 | 885.9 | 79.4 | 3.86E+02 |
| 10.60 | 4538.8 | 8102.3 | 1.79 | 876.5 | 100.0 | 3.44E+02 |
| 11.16 | 4741.7 | 8375.4 | 1.77 | 862.2 | 125.9 | 3.07E+02 |
| 12.30 | 5181.9 | 8919.01 | 1.72 | 838.4 | 158.5 | 2.73E+02 |
| 14.15 | 5880.5 | 9762.21 | 1.66 | 805.4 | 199.5 | 2.42E+02 |
| 16.75 | 6793.2 | 10760.8 | 1.58 | 759.6 | 251.2 | 2.14E+02 |
| 16.79 | 6780.0 | 10581.3 | 1.56 | 748.4 | 316.2 | 1.89E+02 |
| 17.69 | 7065.2 | 10913.4 | 1.55 | 734.8 | 398.1 | 1.66E+02 |
| 19.50 | 7684.8 | 11584.4 | 1.51 | 712.9 | 501.2 | 1.46E+02 |
| 22.43 | 8639.9 | 12584.4 | 1.46 | 680.6 | 631.0 | 1.29E+02 |
| 26.55 | 9872.7 | 13766.4 | 1.39 | 638.0 | 794.3 | 1.13E+02 |
| 26.62 | 9826.4 | 13494.6 | 1.37 | 627.2 | 1000.0 | 9.89E+01 |
| 28.04 | 10230.2 | 13911.6 | 1.36 | 615.8 | — | — |
| 30.91 | 11057.3 | 14686.5 | 1.33 | 594.8 | — | — |
| 35.55 | 12322.4 | 15857.9 | 1.28 | 565.0 | — | — |
| 42.08 | 13944.7 | 17224.6 | 1.24 | 526.6 | — | — |
| 42.18 | 13850.5 | 16830.6 | 1.22 | 516.7 | — | — |
| 44.44 | 14414.4 | 17357.7 | 1.20 | 507.7 | — | — |
| 48.98 | 15492.1 | 18258 | 1.18 | 488.8 | — | — |
| 56.34 | 17088.2 | 19545.4 | 1.14 | 460.8 | — | — |
| 66.70 | 19136.4 | 21080.4 | 1.10 | 426.9 | — | — |
| 66.86 | 18980.8 | 20503.6 | 1.08 | 417.9 | — | — |
| 70.44 | 19703 | 21122.2 | 1.07 | 410.1 | — | — |
| 77.63 | 21066.2 | 22136.4 | 1.05 | 393.6 | — | — |
| 89.29 | 23061.2 | 23589.4 | 1.02 | 369.5 | — | — |
| 105.96 | 25334.9 | 24444.5 | 0.96 | 332.3 | — | — |
| 111.63 | 26243.3 | 25170 | 0.96 | 325.7 | — | — |
| 123.04 | 27925.8 | 26318.5 | 0.94 | 311.9 | — | — |
| 167.93 | 32999.7 | 28559.4 | 0.87 | 259.9 | — | — |
| 176.93 | 34115.3 | 29421.5 | 0.86 | 254.6 | — | — |
| 266.15 | 42011.1 | 32754.3 | 0.78 | 200.2 | — | — |

TABLE 10

SAOS Data of SS Bimodal 107 (29) at 190° C.

| ω rad/s | G' Pa | G" Pa | tan δ | η* Pa·s | ω rad/s | Curve fit η* Pa·s |
|---|---|---|---|---|---|---|
| 0.065 | 17.6 | 137.4 | 7.81 | 2139.9 | 0.0010 | 2.44E+03 |
| 0.089 | 28.9 | 183.3 | 6.35 | 2091.2 | 0.0013 | 2.44E+03 |
| 0.10 | 34.7 | 208.2 | 6.00 | 2057.5 | 0.0016 | 2.43E+03 |
| 0.13 | 48.4 | 250.1 | 5.17 | 2024.8 | 0.0020 | 2.43E+03 |
| 0.14 | 54.8 | 274.7 | 5.01 | 1991.6 | 0.0025 | 2.42E+03 |
| 0.16 | 64.7 | 311.9 | 4.82 | 1958.9 | 0.0032 | 2.41E+03 |
| 0.19 | 83.5 | 349.8 | 4.19 | 1932.9 | 0.0040 | 2.40E+03 |
| 0.20 | 88.4 | 370.1 | 4.19 | 1908.4 | 0.0050 | 2.39E+03 |
| 0.22 | 99.2 | 406.4 | 4.10 | 1876.6 | 0.0063 | 2.38E+03 |
| 0.26 | 116.9 | 458.9 | 3.93 | 1837.4 | 0.0079 | 2.36E+03 |
| 0.29 | 146.7 | 500.7 | 3.41 | 1818.6 | 0.010 | 2.35E+03 |
| 0.29 | 145.9 | 509.3 | 3.49 | 1796.8 | 0.013 | 2.33E+03 |
| 0.32 | 154.6 | 539.5 | 3.49 | 1776.4 | 0.016 | 2.31E+03 |
| 0.35 | 173.3 | 590.8 | 3.41 | 1742.6 | 0.020 | 2.29E+03 |
| 0.41 | 202.5 | 664.5 | 3.28 | 1701.0 | 0.025 | 2.26E+03 |
| 0.45 | 246.4 | 715.8 | 2.90 | 1665.0 | 0.032 | 2.24E+03 |
| 0.47 | 246.0 | 729.5 | 2.97 | 1647.4 | 0.040 | 2.21E+03 |
| 0.48 | 278.9 | 781.7 | 2.80 | 1725.4 | 0.050 | 2.17E+03 |
| 0.50 | 261.5 | 772.3 | 2.95 | 1628.3 | 0.063 | 2.14E+03 |
| 0.56 | 291.4 | 843.8 | 2.90 | 1594.2 | 0.079 | 2.10E+03 |
| 0.65 | 338.0 | 944.5 | 2.79 | 1549.8 | 0.10 | 2.05E+03 |
| 0.72 | 399.6 | 1007.8 | 2.52 | 1504.4 | 0.13 | 2.00E+03 |
| 0.74 | 402.3 | 1028.8 | 2.56 | 1491.6 | 0.16 | 1.95E+03 |
| 0.76 | 438.8 | 1068.5 | 2.44 | 1515.2 | 0.20 | 1.90E+03 |
| 0.79 | 426.2 | 1087.9 | 2.55 | 1472.2 | 0.25 | 1.84E+03 |
| 0.89 | 474.0 | 1185.7 | 2.50 | 1438.7 | 0.32 | 1.77E+03 |
| 1.03 | 546.3 | 1323.9 | 2.42 | 1396.1 | 0.40 | 1.70E+03 |
| 1.14 | 628.5 | 1394.1 | 2.218 | 1339.0 | 0.50 | 1.63E+03 |
| 1.17 | 635.4 | 1424.4 | 2.242 | 1328.8 | 0.63 | 1.56E+03 |
| 1.21 | 678.7 | 1457.4 | 2.15 | 1330.6 | 0.79 | 1.48E+03 |
| 1.26 | 674.8 | 1506.0 | 2.23 | 1311.9 | 1.0 | 1.40E+03 |
| 1.41 | 746.3 | 1638.4 | 2.20 | 1279.9 | 1.3 | 1.33E+03 |
| 1.63 | 854.5 | 1815.5 | 2.12 | 1234.1 | 1.6 | 1.25E+03 |
| 1.81 | 953.6 | 1893.6 | 1.99 | 1171.3 | 2.0 | 1.16E+03 |
| 1.86 | 976.1 | 1941.4 | 1.99 | 1168.1 | 2.5 | 1.09E+03 |
| 1.91 | 1027.0 | 1970.2 | 1.92 | 1160.2 | 3.2 | 1.01E+03 |
| 1.99 | 1036.1 | 2052.2 | 1.98 | 1153.2 | 4.0 | 9.30E+02 |
| 2.23 | 1141.8 | 2224.8 | 1.94 | 1121.7 | 5.0 | 8.56E+02 |
| 2.58 | 1288.0 | 2455.3 | 1.90 | 1076.0 | 6.3 | 7.85E+02 |
| 2.87 | 1420.8 | 2536.7 | 1.79 | 1013.5 | 7.9 | 7.18E+02 |
| 2.94 | 1460.6 | 2608.5 | 1.79 | 1014.0 | 10.0 | 6.53E+02 |
| 3.04 | 1517.0 | 2625.2 | 1.73 | 999.0 | 12.6 | 5.93E+02 |
| 3.16 | 1549.0 | 2750.1 | 1.78 | 999.0 | 15.8 | 5.37E+02 |
| 3.53 | 1686.6 | 2963.8 | 1.76 | 965.1 | 20.0 | 4.84E+02 |
| 4.08 | 1906.6 | 3264.8 | 1.71 | 925.7 | 25.1 | 4.36E+02 |
| 4.55 | 2096.9 | 3364.5 | 1.60 | 871.9 | 31.6 | 3.91E+02 |
| 4.67 | 2134.5 | 3433.7 | 1.61 | 865.2 | 39.8 | 3.50E+02 |
| 4.81 | 2198.0 | 3454.3 | 1.57 | 851.2 | 50.1 | 3.13E+02 |
| 5.01 | 2241.5 | 3618.2 | 1.61 | 849.9 | 63.1 | 2.79E+02 |
| 5.60 | 2452.2 | 3898.1 | 1.59 | 822.4 | 79.4 | 2.49E+02 |
| 6.47 | 2757.2 | 4273.1 | 1.55 | 785.6 | 100.0 | 2.21E+02 |
| 7.20 | 2994.9 | 4379.9 | 1.46 | 736.2 | 125.9 | 1.97E+02 |
| 7.40 | 3022.7 | 4469.0 | 1.48 | 728.5 | 158.5 | 1.74E+02 |
| 7.62 | 3121.0 | 4483.7 | 1.44 | 716.6 | 199.5 | 1.55E+02 |
| 7.94 | 3200.6 | 4700.3 | 1.47 | 716.5 | 251.2 | 1.37E+02 |
| 8.88 | 3489.6 | 5048.2 | 1.45 | 691.5 | 316.2 | 1.21E+02 |
| 10.26 | 3908.6 | 5516.3 | 1.41 | 659.0 | 398.1 | 1.07E+02 |
| 11.42 | 4151.2 | 5597.3 | 1.35 | 610.2 | 501.2 | 9.45E+01 |
| 11.74 | 4234.3 | 5730.1 | 1.35 | 607.0 | 631.0 | 8.34E+01 |
| 12.08 | 4352.5 | 5724.0 | 1.31 | 595.1 | 794.3 | 7.36E+01 |
| 12.58 | 4477.9 | 6016.7 | 1.34 | 596.2 | 1000.0 | 6.49E+01 |
| 14.07 | 4873.6 | 6449.1 | 1.32 | 574.7 | — | — |
| 16.26 | 5429.2 | 7011.8 | 1.29 | 545.4 | — | — |
| 18.10 | 5702.4 | 7076.1 | 1.24 | 502.1 | — | — |
| 18.60 | 5822.5 | 7244.9 | 1.24 | 499.6 | — | — |
| 19.15 | 5897.3 | 7212.4 | 1.22 | 486.5 | — | — |
| 19.94 | 6157.8 | 7603.0 | 1.23 | 490.8 | — | — |
| 22.29 | 6691.4 | 8141.0 | 1.22 | 472.7 | — | — |
| 25.77 | 7415.9 | 8819.0 | 1.19 | 447.1 | — | — |
| 28.69 | 7699.2 | 8826.4 | 1.14 | 408.3 | — | — |
| 29.48 | 7875.2 | 9046.0 | 1.15 | 406.8 | — | — |
| 30.35 | 7932.7 | 8975.9 | 1.13 | 394.7 | — | — |
| 31.60 | 8310.3 | 9466.0 | 1.14 | 398.7 | — | — |
| 35.33 | 8997.6 | 10112.1 | 1.12 | 383.1 | — | — |
| 40.84 | 9924.8 | 10919.8 | 1.10 | 361.3 | — | — |
| 45.47 | 10235.9 | 10884.9 | 1.06 | 328.6 | — | — |
| 46.73 | 10465.5 | 11138.4 | 1.06 | 327.1 | — | — |
| 48.10 | 10498.5 | 11029.9 | 1.05 | 316.6 | — | — |
| 50.078 | 11025.8 | 11643.2 | 1.06 | 320.2 | — | — |
| 56.00 | 11897.3 | 12415.4 | 1.04 | 307.1 | — | — |
| 64.73 | 13058.9 | 13377.5 | 1.02 | 288.8 | — | — |
| 72.06 | 13386.1 | 13245.3 | 0.99 | 261.3 | — | — |
| 74.06 | 13690.5 | 13562.8 | 0.99 | 260.2 | — | — |
| 76.24 | 13699.0 | 13413.8 | 0.98 | 251.5 | — | — |
| 79.37 | 14403.3 | 14166.1 | 0.98 | 254.5 | — | — |
| 88.75 | 15484.1 | 15091.8 | 0.97 | 243.6 | — | — |
| 114.21 | 17255.5 | 15960 | 0.92 | 205.8 | — | — |
| 117.38 | 17653.0 | 16348.9 | 0.93 | 205.0 | — | — |
| 120.83 | 17609.7 | 16122.4 | 0.92 | 197.6 | — | — |
| 125.79 | 18535.6 | 17069.2 | 0.92 | 200.3 | — | — |
| 181.01 | 21960.8 | 19061.5 | 0.87 | 160.6 | — | — |
| 186.03 | 22459.6 | 19537.6 | 0.87 | 160.0 | — | — |
| 191.50 | 22361.3 | 19216.2 | 0.86 | 154.0 | — | — |
| 286.89 | 27623.2 | 22585.4 | 0.82 | 124.3 | — | — |
| 303.51 | 28065.3 | 22701.9 | 0.81 | 118.9 | — | — |
| 481.02 | 34872.0 | 26621.9 | 0.76 | 91.2 | — | — |

TABLE 11

SAOS Data of SS Bimodal 108 (34) at 190° C.

| ω rad/s | G' Pa | G" Pa | tan δ | η* Pa·s | ω rad/s | Curve fit η* Pa·s |
|---|---|---|---|---|---|---|
| 0.065 | 14.5 | 119.9 | 8.25 | 1854.2 | 0.0010 | 2.14E+03 |
| 0.089 | 23.6 | 159.3 | 6.74 | 1815.2 | 0.0013 | 2.13E+03 |
| 0.10 | 28.6 | 182.5 | 6.38 | 1789.1 | 0.0016 | 2.13E+03 |
| 0.12 | 40.0 | 216.3 | 5.41 | 1764.2 | 0.0020 | 2.12E+03 |
| 0.14 | 45.5 | 240.1 | 5.28 | 1737.7 | 0.0025 | 2.11E+03 |
| 0.16 | 54.4 | 274.1 | 5.04 | 1707.4 | 0.0032 | 2.11E+03 |
| 0.18 | 68.9 | 302.0 | 4.38 | 1695.3 | 0.0040 | 2.10E+03 |
| 0.20 | 73.6 | 322.1 | 4.38 | 1671.7 | 0.0050 | 2.09E+03 |
| 0.22 | 83.1 | 356.3 | 4.29 | 1641.6 | 0.0063 | 2.08E+03 |
| 0.26 | 99.0 | 405.3 | 4.09 | 1608.2 | 0.0079 | 2.07E+03 |
| 0.28 | 122.4 | 434.6 | 3.55 | 1601.6 | 0.010 | 2.05E+03 |
| 0.29 | 121.8 | 441.9 | 3.63 | 1582.7 | 0.012 | 2.04E+03 |
| 0.31 | 130.5 | 470.7 | 3.60 | 1559.6 | 0.016 | 2.02E+03 |
| 0.35 | 147.1 | 520.5 | 3.54 | 1531.4 | 0.020 | 2.00E+03 |
| 0.41 | 173.0 | 589.3 | 3.41 | 1493.8 | 0.025 | 1.98E+03 |
| 0.45 | 207.2 | 624.1 | 3.01 | 1471.6 | 0.032 | 1.95E+03 |
| 0.46 | 207.5 | 636.3 | 3.07 | 1458.3 | 0.040 | 1.93E+03 |
| 0.50 | 222.0 | 677.6 | 3.05 | 1436.3 | 0.050 | 1.90E+03 |
| 0.56 | 249.1 | 745.8 | 2.99 | 1404.8 | 0.063 | 1.87E+03 |
| 0.65 | 291.7 | 841.5 | 2.88 | 1366.7 | 0.079 | 1.83E+03 |
| 0.71 | 338.8 | 881.3 | 2.60 | 1333.3 | 0.10 | 1.79E+03 |
| 0.73 | 341.6 | 899.6 | 2.63 | 1322.9 | 0.13 | 1.75E+03 |
| 0.79 | 364.1 | 956.3 | 2.62 | 1300.6 | 0.16 | 1.71E+03 |
| 0.89 | 408.8 | 1051.3 | 2.57 | 1271.4 | 0.20 | 1.66E+03 |
| 1.03 | 474.3 | 1181.9 | 2.49 | 1233.2 | 0.25 | 1.61E+03 |
| 1.12 | 538.0 | 1222.9 | 2.27 | 1190.3 | 0.32 | 1.55E+03 |
| 1.15 | 542.5 | 1249.9 | 2.30 | 1181.9 | 0.40 | 1.49E+03 |
| 1.25 | 580.5 | 1329.3 | 2.29 | 1163.3 | 0.50 | 1.43E+03 |
| 1.41 | 647.9 | 1457.3 | 2.25 | 1134.3 | 0.63 | 1.37E+03 |
| 1.64 | 747.7 | 1630.7 | 2.18 | 1096.1 | 0.79 | 1.30E+03 |
| 1.78 | 827.5 | 1669.8 | 2.02 | 1047.6 | 1.00 | 1.24E+03 |
| 1.83 | 838.8 | 1707.9 | 2.04 | 1041.4 | 1.26 | 1.17E+03 |
| 1.98 | 896.5 | 1812.6 | 2.02 | 1023.9 | 1.58 | 1.10E+03 |
| 2.23 | 996.9 | 1985.3 | 1.99 | 996.9 | 2.00 | 1.03E+03 |
| 2.59 | 1132.8 | 2206.8 | 1.95 | 956.2 | 2.51 | 9.62E+02 |
| 2.82 | 1241.2 | 2243.9 | 1.81 | 909.6 | 3.16 | 8.94E+02 |
| 2.90 | 1262.0 | 2299.6 | 1.82 | 905.8 | 3.98 | 8.28E+02 |

TABLE 11-continued

SAOS Data of SS Bimodal 108 (34) at 190° C.

| ω rad/s | G' Pa | G" Pa | tan δ | η* Pa·s | ω rad/s | η* Pa·s (Curve fit) |
|---|---|---|---|---|---|---|
| 3.13 | 1348.5 | 2442.8 | 1.81 | 890.9 | 5.01 | 7.63E+02 |
| 3.53 | 1479.4 | 2653.2 | 1.79 | 860.0 | 6.31 | 7.01E+02 |
| 4.11 | 1684.2 | 2942.7 | 1.75 | 824.7 | 7.94 | 6.42E+02 |
| 4.47 | 1818.9 | 2968.5 | 1.63 | 779.1 | 10.00 | 5.86E+02 |
| 4.59 | 1853.0 | 3047.0 | 1.64 | 777.0 | 12.59 | 5.33E+02 |
| 4.96 | 1958.2 | 3222.4 | 1.65 | 759.6 | 15.85 | 4.83E+02 |
| 5.60 | 2159.6 | 3498.5 | 1.62 | 734.5 | 19.95 | 4.37E+02 |
| 6.52 | 2445.7 | 3863.1 | 1.58 | 701.7 | 25.12 | 3.94E+02 |
| 7.08 | 2608.2 | 3881.0 | 1.49 | 660.3 | 31.62 | 3.54E+02 |
| 7.27 | 2633.9 | 3964.5 | 1.51 | 654.3 | 39.81 | 3.18E+02 |
| 7.87 | 2806.4 | 4197.2 | 1.50 | 641.8 | 50.12 | 2.85E+02 |
| 8.87 | 3084.3 | 4544.4 | 1.47 | 619.1 | 63.10 | 2.55E+02 |
| 10.33 | 3478.5 | 5002.0 | 1.44 | 590.0 | 79.43 | 2.28E+02 |
| 11.22 | 3626.5 | 4974.0 | 1.37 | 548.4 | 100.0 | 2.03E+02 |
| 11.53 | 3701.9 | 5100.8 | 1.38 | 546.7 | 125.9 | 1.81E+02 |
| 12.47 | 3938.8 | 5389.2 | 1.37 | 535.3 | 158.5 | 1.60E+02 |
| 14.06 | 4320.2 | 5823.5 | 1.35 | 515.7 | 199.5 | 1.43E+02 |
| 16.37 | 4844.5 | 6376.5 | 1.32 | 489.3 | 251.2 | 1.26E+02 |
| 17.79 | 4993.6 | 6309.2 | 1.26 | 452.3 | 316.2 | 1.12E+02 |
| 18.27 | 5100.8 | 6463.3 | 1.27 | 450.6 | 398.1 | 9.92E+01 |
| 19.76 | 5429.0 | 6831.4 | 1.26 | 441.6 | 501.2 | 8.78E+01 |
| 22.29 | 5933.9 | 7353.9 | 1.24 | 424.0 | 631.0 | 7.77E+01 |
| 25.94 | 6621.4 | 8025.3 | 1.21 | 401.1 | 794.3 | 6.86E+01 |
| 28.19 | 6758.9 | 7896.1 | 1.17 | 368.7 | 1000.0 | 6.06E+01 |
| 28.96 | 6916.5 | 8098.6 | 1.17 | 367.8 | — | — |
| 31.32 | 7348.8 | 8537.3 | 1.16 | 359.6 | — | — |
| 35.32 | 8022.2 | 9200.5 | 1.15 | 345.6 | — | — |
| 41.11 | 8908.9 | 10010.9 | 1.12 | 326.0 | — | — |
| 44.68 | 9008.2 | 9774.3 | 1.09 | 297.5 | — | — |
| 45.90 | 9217.7 | 10013.9 | 1.09 | 296.5 | — | — |
| 49.64 | 9777.3 | 10545.8 | 1.08 | 289.7 | — | — |
| 55.98 | 10637.9 | 11346.0 | 1.07 | 277.8 | — | — |
| 65.16 | 11756.8 | 12323.2 | 1.05 | 261.4 | — | — |
| 70.82 | 11815 | 11953.4 | 1.01 | 237.3 | — | — |
| 72.74 | 12093.2 | 12252.6 | 1.01 | 236.7 | — | — |
| 78.68 | 12809.9 | 12894.2 | 1.00 | 231.0 | — | — |
| 88.72 | 13884.2 | 13860.7 | 1.00 | 221.1 | — | — |
| 112.24 | 15273.5 | 14475.4 | 0.95 | 187.5 | — | — |
| 115.29 | 15644.3 | 14851.3 | 0.95 | 187.1 | — | — |
| 124.69 | 16540.2 | 15625.1 | 0.94 | 182.5 | — | — |
| 177.89 | 19496.4 | 17378.5 | 0.89 | 146.8 | — | — |
| 182.71 | 19982.2 | 17861.2 | 0.89 | 146.7 | — | — |
| 281.93 | 24616.9 | 20717.6 | 0.84 | 114.1 | — | — |

TABLE 12

SAOS Data of SS Unimodal LMW-1 (35) at 190° C.

| ω rad/s | G' Pa | G" Pa | tan δ | η* Pa·s | ω rad/s | η* Pa·s (Curve fit) |
|---|---|---|---|---|---|---|
| 0.066 | 3.7 | 67.2 | 18.38 | 1024.6 | 0.0010 | 1.08E+03 |
| 0.089 | 6.0 | 90.1 | 15.12 | 1014.9 | 0.0013 | 1.08E+03 |
| 0.10 | 7.3 | 104.9 | 14.39 | 1010.7 | 0.0016 | 1.08E+03 |
| 0.12 | 10.1 | 124.2 | 12.27 | 1002.3 | 0.0020 | 1.08E+03 |
| 0.14 | 11.5 | 140.2 | 12.15 | 997.5 | 0.0025 | 1.08E+03 |
| 0.16 | 14.3 | 163.0 | 11.41 | 992.1 | 0.0032 | 1.08E+03 |
| 0.18 | 17.3 | 176.3 | 10.16 | 981.0 | 0.0040 | 1.08E+03 |
| 0.20 | 19.5 | 192.1 | 9.84 | 980.4 | 0.0050 | 1.08E+03 |
| 0.22 | 22.8 | 217.1 | 9.51 | 976.7 | 0.0063 | 1.07E+03 |
| 0.26 | 28.1 | 252.4 | 8.97 | 971.5 | 0.0079 | 1.07E+03 |
| 0.27 | 33.4 | 261.2 | 7.83 | 960.2 | 0.010 | 1.07E+03 |
| 0.29 | 34.3 | 271.4 | 7.91 | 955.9 | 0.013 | 1.07E+03 |
| 0.31 | 37.8 | 294.9 | 7.81 | 952.3 | 0.016 | 1.06E+03 |
| 0.35 | 44.6 | 333.2 | 7.47 | 948.9 | 0.020 | 1.06E+03 |
| 0.41 | 55.2 | 385.4 | 6.98 | 939.7 | 0.025 | 1.05E+03 |
| 0.43 | 63.2 | 397.5 | 6.29 | 926.0 | 0.032 | 1.05E+03 |
| 0.45 | 65.4 | 413.6 | 6.32 | 923.3 | 0.040 | 1.04E+03 |
| 0.49 | 71.6 | 449.2 | 6.28 | 919.3 | 0.050 | 1.04E+03 |
| 0.56 | 84.9 | 505.6 | 5.95 | 913.2 | 0.063 | 1.03E+03 |
| 0.66 | 104.5 | 583.5 | 5.59 | 902.9 | 0.079 | 1.02E+03 |
| 0.69 | 116.4 | 598.3 | 5.14 | 884.9 | 0.10 | 1.01E+03 |
| 0.72 | 120.5 | 622.7 | 5.17 | 882.4 | 0.13 | 1.00E+03 |
| 0.78 | 134.3 | 675.6 | 5.03 | 878.3 | 0.16 | 9.92E+02 |
| 0.89 | 156.8 | 757.6 | 4.83 | 869.5 | 0.20 | 9.80E+02 |
| 1.04 | 191.6 | 870.9 | 4.55 | 856.9 | 0.25 | 9.66E+02 |
| 1.09 | 209.7 | 888.0 | 4.23 | 835.7 | 0.32 | 9.51E+02 |
| 1.14 | 217.5 | 923.53 | 4.25 | 832.9 | 0.40 | 9.35E+02 |
| 1.24 | 241.0 | 1000.6 | 4.15 | 828.0 | 0.50 | 9.16E+02 |
| 1.41 | 280.5 | 1118.9 | 3.99 | 817.9 | 0.63 | 8.96E+02 |
| 1.65 | 338.8 | 1280.1 | 3.78 | 802.8 | 0.79 | 8.75E+02 |
| 1.73 | 364.8 | 1298.3 | 3.56 | 779.4 | 1.00 | 8.51E+02 |
| 1.80 | 379.9 | 1350.0 | 3.55 | 776.8 | 1.26 | 8.26E+02 |
| 1.97 | 420.3 | 1460.7 | 3.48 | 771.6 | 1.58 | 7.99E+02 |
| 2.24 | 486.0 | 1625.9 | 3.35 | 759.2 | 2.00 | 7.70E+02 |
| 2.61 | 578.2 | 1848.4 | 3.20 | 740.9 | 2.51 | 7.40E+02 |
| 2.74 | 617.4 | 1870.7 | 3.03 | 718.3 | 3.16 | 7.08E+02 |
| 2.86 | 644.6 | 1942.0 | 3.01 | 715.1 | 3.98 | 6.75E+02 |
| 3.12 | 710.3 | 2095.0 | 2.95 | 708.6 | 5.01 | 6.41E+02 |
| 3.54 | 809.8 | 2319.1 | 2.86 | 693.4 | 6.31 | 6.06E+02 |
| 4.14 | 960.5 | 2622.4 | 2.73 | 674.1 | 7.94 | 5.71E+02 |
| 4.35 | 1016.4 | 2645.2 | 2.60 | 652.0 | 10.00 | 5.35E+02 |
| 4.53 | 1059.9 | 2745.9 | 2.59 | 649.0 | 12.59 | 4.99E+02 |
| 4.95 | 1155.2 | 2946.6 | 2.55 | 639.6 | 15.85 | 4.64E+02 |
| 5.61 | 1316.7 | 3251.2 | 2.47 | 624.8 | 19.95 | 4.30E+02 |
| 6.57 | 1547.4 | 3652.8 | 2.36 | 604.2 | 25.12 | 3.97E+02 |
| 6.89 | 1625.4 | 3675.0 | 2.26 | 583.4 | 31.62 | 3.64E+02 |
| 7.19 | 1677.8 | 3800.4 | 2.27 | 578.0 | 39.81 | 3.33E+02 |
| 7.84 | 1834.3 | 4072.7 | 2.22 | 569.6 | 50.12 | 3.04E+02 |
| 8.90 | 2078.3 | 4472.6 | 2.15 | 554.3 | 63.10 | 2.76E+02 |
| 10.40 | 2423.4 | 4998.5 | 2.06 | 533.8 | 79.43 | 2.50E+02 |
| 10.92 | 2500.9 | 4996.0 | 2.00 | 511.6 | 100.0 | 2.26E+02 |
| 11.39 | 2601.0 | 5171.8 | 1.99 | 508.2 | 125.9 | 2.03E+02 |
| 12.43 | 2832.9 | 5523.0 | 1.95 | 499.4 | 158.5 | 1.83E+02 |
| 14.10 | 3192.6 | 6042.0 | 1.89 | 484.6 | 199.5 | 1.64E+02 |
| 16.49 | 3688.6 | 6704.1 | 1.82 | 463.9 | 251.2 | 1.46E+02 |
| 17.30 | 3776.9 | 6677.1 | 1.77 | 443.4 | 316.2 | 1.31E+02 |
| 18.05 | 3924.6 | 6903.6 | 1.76 | 439.9 | 398.1 | 1.16E+02 |
| 19.70 | 4261.7 | 7356.5 | 1.73 | 431.6 | 501.2 | 1.03E+02 |
| 22.35 | 4772.6 | 8004.7 | 1.68 | 417.0 | 631.0 | 9.18E+01 |
| 26.14 | 5479.0 | 8855.9 | 1.62 | 398.4 | 794.3 | 8.14E+01 |
| 27.42 | 5559.0 | 8756.1 | 1.58 | 378.2 | 1000.0 | 7.21E+01 |
| 28.61 | 5777.0 | 9050.2 | 1.57 | 375.2 | — | — |
| 31.22 | 6247.4 | 9605.8 | 1.54 | 367.0 | — | — |
| 35.42 | 6968.9 | 10440.1 | 1.50 | 354.3 | — | — |
| 41.43 | 7916.2 | 11447.1 | 1.45 | 335.9 | — | — |
| 43.46 | 7995.3 | 11279.1 | 1.41 | 318.1 | — | — |
| 45.35 | 8294.4 | 11631.3 | 1.40 | 315.0 | — | — |
| 49.48 | 8936.1 | 12314.2 | 1.38 | 307.5 | — | — |
| 56.14 | 9908.4 | 13330.1 | 1.35 | 295.8 | — | — |
| 65.66 | 11163.0 | 14539.8 | 1.30 | 279.2 | — | — |
| 68.88 | 11227.9 | 14240.6 | 1.27 | 263.3 | — | — |
| 71.87 | 11636.2 | 14681.6 | 1.26 | 260.6 | — | — |
| 78.42 | 12493.3 | 15500.7 | 1.24 | 253.9 | — | — |
| 88.98 | 13759.7 | 16717.2 | 1.21 | 243.3 | — | — |
| 109.17 | 15422.6 | 17657.4 | 1.14 | 214.7 | — | — |
| 113.91 | 15963.1 | 18187.9 | 1.14 | 212.4 | — | — |
| 124.29 | 17077.3 | 19167.5 | 1.12 | 206.5 | — | — |
| 173.03 | 20740.7 | 21500.1 | 1.04 | 172.7 | — | — |
| 180.54 | 21432.6 | 22137.2 | 1.03 | 170.7 | — | — |
| 274.23 | 27322.6 | 25728.8 | 0.94 | 136.9 | — | — |

TABLE 13

Summary of SAOS data and Ratios of
zero shear to shear at 200 rad/sec

| Sample | $\eta_0$ | $\eta_{200}$ | $\eta_0/\eta_{200}$ |
|---|---|---|---|
| ZN hPP-2 (16) | 1930 | 200 | 9.65 |
| 107 (29) | 2480 | 91 | 27.65 |
| 108 (34) | 2170 | 114 | 19.03 |
| LMW-1 (35) | 1090 | 137 | 7.95 |

TABLE 14

Capillary Shear Viscosity Data Summary

| bPP 104 (23) | | LMW-1 (35) | | ZN hPP-2 (16) | |
|---|---|---|---|---|---|
| Shear Rate 1/sec | Viscosity, Pa·s | Shear Rate 1/sec | Viscosity, Pa·s | Shear Rate 1/sec | Viscosity, Pa·s |
| 10.22 | 748.2 | 9.57 | 610.9 | 9.95 | 758.85 |
| 13.56 | 695.15 | 12.735 | 552.5 | 13.215 | 701.3 |
| 33.385 | 494.25 | 31.62 | 395.3 | 32.57 | 517 |
| 66.065 | 367.55 | 62.965 | 296.3 | 64.51 | 397.5 |
| 98.535 | 307.55 | 94.245 | 248 | 96.265 | 336.1 |
| 130.825 | 229.8 | 125.44 | 217.55 | 127.855 | 292.5 |
| 322.865 | 140.8 | 311.98 | 137.25 | 315.88 | 174.8 |
| 639.73 | 95.45 | 621.65 | 92.75 | 626.37 | 114.6 |
| 954.515 | 74.9 | 930.525 | 73.1 | 934.98 | 88.85 |
| 1267.98 | 62.9 | 1238.9 | 61.7 | 1242.4 | 74 |
| 1892.245 | 48.95 | 1854.645 | 47.9 | 1854.825 | 57 |
| 2513.995 | 41.05 | 2469.435 | 40.15 | 2464.965 | 47.5 |

Having described the various features of the inventive melt blended polypropylene compositions and methods of making them, described here in numbered paragraphs is:

P1. Polypropylene compositions, preferably melt blended bimodal polypropylene compositions, comprising (or consisting of, or consisting essentially of) at least two polypropylenes having a Flexural Modulus (190° C., 1% secant) of at least 1700 MPa; and any one or more of the following features: (a) a melt flow rate (MFR$_{bPP}$, 230° C., 2.16 kg) within the range from 2, or 5, or 10, or 15 g/10 min to 80, or 100, or 120, or 140, or 160, or 180, or 200 g/10 min; and/or (b) a combined molecular weight distribution (Mw$_{bPP}$/Mn$_{bPP}$, MWD$_{bPP}$) within the range from 2.5, or 3.0, or 3.5, or 4.0, or 5.0 to 12.0, or 16.0, or 18.0, or 20.0; and/or (c) a ΔMw (the difference between the two polypropylenes) of at least 100,000, or 200,000, or 300,000 g/mole.

P2. The Polypropylene compositions of numbered paragraph 1, comprising:
a HMW polypropylene having a weight average molecular weight (Mw) of 300,000, or 400,000 g/mole or more, and a MWD within the range from 2.0 to 4.5; and
a LMW polypropylene having a weight average molecular weight (Mw) of 300,000, or 200,000 g/mole or less, and a MWD within the range from 2.0 to 4.5.

P3. The polypropylene compositions of numbered paragraphs 1 or 2, having a Heat Deflection Temperature (HDT) of greater than 95, or 98, or 100, or 102° C.; or within a range from 95 to 110° C.

P4. The polypropylene compositions of any one of the previous numbered paragraphs, having a melting point temperature T$_{m2}$ within the range from 150, or 152° C. to 158, or 160, or 165° C.

P5. The polypropylene compositions of any one of the previous numbered paragraphs, having an MWD$_{bPP}$ within the range from 2.5, or 3.0, or 3.5, or 4.0, or 5.0 to 12.0, or 16.0, or 18.0, or 20.0.

P6. The polypropylene compositions of any one of the previous numbered paragraphs, having a melt flow rate (MFR$_{bPP}$, 230° C., 2.16 kg) within the range from 2, or 5, or 10, or 15 g/10 min to 80, or 100, or 120, or 140, or 160, or 180, or 200 g/10 min.

P6. The polypropylene compositions of any one of the previous numbered paragraphs, having a Flexural Modulus within the range from 1700, or 1750, or 1800 MPa to 1900, or 1950, or 2000, or 2500, or 3000 MPa.

P7. The polypropylene compositions of any one of the previous numbered paragraphs, wherein the Flexural Modulus is equal to or at least 5, or 10, or 15% greater than the HMW component Flexural Modulus alone.

P8. The polypropylene compositions of any one of the previous numbered paragraphs, wherein within the range from 5, or 10, or 15, or 20, or 25, or 30, or 35, or 40 wt % to 50, or 55, or 60, or 65 wt % (based upon weight of the blend) of a HMW polypropylene is present, and within the range from 35, or 40, or 45, or 50 wt % to 60, or 65, or 70, or 75, or 80, or 85, or 90, or 95 wt % (based upon weight of the blend) of a LMW polypropylene is present.

P9. The polypropylene compositions of any one of the previous numbered paragraphs, wherein the Mw of the HMW polypropylene is within a range from 300,000, or 350,000, or 400,000 g/mole to 600,000, or 700,000, or 800,000, or 1,000,000 g/mole.

P10. The polypropylene compositions of any one of the previous numbered paragraphs, wherein the Mw of the LMW polypropylene is within a range from 50,000, or 80,000, or 100,000, or 150,000 g/mole to 200,000, 250,000, or 300,000 g/mole.

P11. The polypropylene compositions of any one of the previous numbered paragraphs, having a Shear Viscosity (190° C., Capillary Rheology) $\eta_{2500}$ value of less than 47, or 45, or 43 Pa·sec at 2500 l/sec, or within a range from 5, or 10, or 20 Pa·sec to 43, or 45, or 50 Pa·sec at 2500 l/sec.

P12. The polypropylene compositions of any one of the previous numbered paragraphs, having a ratio of Complex Viscosities (190° C., SAOS) of zero shear $\eta_0$ and at a shear frequency of 200 rad/sec $\eta_{200}$ ($\eta_0/\eta_{200}$) of greater than 10, or 12, or 16, or 20, or within a range from 10, or 12, or 16 to 20, or 30, or 40.

P13. The polypropylene compositions of any one of the previous numbered paragraphs, wherein the LMW and HMW polypropylenes are melt blended to form the composition.

P14. The polypropylene compositions of any one of the previous numbered paragraphs, formed by melt blending, most preferably melt blending in a two-pass melt blending process.

P15. The polypropylene compositions of any one of the previous numbered paragraphs, further comprising another polymeric component selected from the group consisting of styrenic block copolymers, ethylene-propylene elastomers, ethylene-based plastomers, propylene-based elastomers, propylene-based impact copolymers, and combinations thereof.

P16. The polypropylene compositions of any one of the previous numbered paragraphs, further comprising within the range from 10, or 20, or 50 ppm to 400, or 600, or 1000, or 2000, or 3000 ppm of each of an antioxidant and/or acid scavenger.

P17. Thermoformed articles, injection molded articles, or blow molded articles, foamed or non-foamed, comprising the bimodal polypropylene compositions of any one of the previous numbered paragraphs.

P18. A process to form bimodal polypropylene composition comprising (or consisting of, or consisting essentially of) combining at least two polypropylenes in at least a two-pass process, and forming a bimodal polypropylene composition of any one of the previous numbered paragraphs.

P19. The process of numbered paragraph 18, wherein the combining takes place at a $T_{melt}$ within the range from 140, or 150, or 160° C. to 170, or 180, or 190, or 200° C.; preferably the $T_{melt}$ at the feeder zone is within a range from 140 to 180° C., and the $T_{melt}$ at the die zone is within a range from 160 to 200° C.

P20. The process of any one of numbered paragraphs 18-19, wherein the melt blending takes place in an extruder having a feeder zone and a die zone, wherein a temperature gradient is provided from a feeder zone to a die zone of at least +5, or +10, or +20° C.

P21. The process of any one of numbered paragraphs 18-20, wherein the bimodal polypropylene composition has a Flexural Modulus within the range from 1700, or 1750, or 1800 MPa to 1900, or 1950, or 2000, or 2500, or 3000 MPa.

P22. The process of any one of numbered paragraphs 18-21, wherein the $MWD_{bPP}$ is within the range from 2.5, or 3.0, or 3.5, or 4.0, or 5.0 to 12.0, or 16.0, or 18.0, or 20.0.

P23. The process of any one of numbered paragraphs 18-22, wherein processing of the bimodal polypropylene to form pellets or an article takes place at a Shear Viscosity ($\eta_{2500}$, 190° C., using Capillary Rheology) of less than 60, or 50, or 45 Pa·sec, or within the range from 5, or 10, or 20 Pa·sec to 45, or 50, or 60 Pa·sec at a shear rate of 2,000 rad/sec; or at a Complex Viscosity ($\eta_{200}$, 190° C., using SAOS) of less than 200, or 180 Pa·sec, or within a range from 50, or 80, or 100 Pa·sec to 160, or 180, or 200 Pa·sec at 200 rad/sec.

P24. The process of any one of numbered paragraphs 18-23, wherein the two-pass process comprises (or consists essentially of):
a) combining 5, or 10, or 15, or 20, or 25, or 30, or 35, or 40 wt % to 50, or 55, or 60, or 65 wt % (based upon weight of the combined components) of a HMW polypropylene having an Mw of 300,000, or 400,000 g/mol or more and an Mw/Mn of within the range from 2.0 to 4.5, with 35, or 40, or 45, or 50 wt % to 60, or 65, or 70, or 75, or 80, or 85, or 90, or 95 wt % (based upon weight of the combined components) of a LMW polypropylene having an Mw of 300,000, or 200,000 g/mol or less and an Mw/Mn within the range from 2.0 to 4.5, where the difference in Mw between the HMW PP and the LMW PP is at least 100,000, or 200,000, or 300.00 g/mol, and
b) melt blending in an extruder the components in a) at a melt $T_{melt}$ within the range from 140, or 150, or 160° C. to 170, or 180, or 190, or 200, or 210, or 220, or 230° C.;
c) cooling the blend produced in step b) to produce a solid blend;
d) introducing the solid blend into the same or different extruder and further melt blending the solid blend at a $T_{melt}$ within the range from 140, or 150, or 160° C. to 170, or 180, or 190, or 200, or 210, or 220, or 230° C.; and
e) isolating the blend produced in step d) to produce the bimodal polypropylene composition.

P25. The process or composition of any one of the previous numbered paragraphs, wherein fillers are substantially absent; and/or wherein nucleating agents are substantially absent.

P26. The process or composition of any one of the previous numbered paragraphs, wherein at least one of the polypropylenes is formed from a single-site catalyst, preferably, all of the at least two polypropylenes are formed from a single-site catalyst.

P27. The process of any one of numbered paragraphs 18-26, comprising the further step of injection molding or blow molding articles from the bimodal polypropylene composition; wherein a foaming agent may be present to effectuate a foamed article.

The invention also includes the use of a bimodal polypropylene as described herein in an impact copolymer comprising an elastomeric polymer and optionally a filler.

The invention also includes the use of a single- or twin-screw extruder to perform a two-pass extrusion as described herein of a LMW and HMW blend of produced polypropylenes to produce a melt blended bPP as described herein.

The phrase "consisting essentially of" means that no other additives (antioxidants, antistatic agents, anti-slip agents, stabilizers, clarifiers, fillers, elastomers) are present in the composition being referred to other than those named in the claim, or, if present, are present to a level no greater than 0.5, or 1.0, or 2.0, or 4.0 wt % by weight of the composition; and in a process, "consisting essentially of" means that no other major process step is present or effects the claimed composition properties such that the value would be outside the claim scope.

In particular embodiments, nucleators and/or fillers are substantially absent from the inventive compositions and process, where other additives such as antioxidants may be present. In these cases, the nucleators and/or fillers are "substantially absent" meaning that there are no nucleating agents (e.g., sodium benzoate, kaolin, sorbitols, pimelic acid salts, nucleators such as HPN-600ei or HPN-68L from Milliken, etc.) and/or fillers (e.g., talc, silica, calcium carbonate, titanium dioxide), as the case may be, included in the referenced composition, or if they are present, they are present to less than 3, or 2, or 1 wt % of the composition. Most preferably, the phrases "substantially no nucleator" and "substantially no filler" means that the claimed properties, such as Flexural Modulus, are achieved in the absence of these additives.

For all jurisdictions in which the doctrine of "incorporation by reference" applies, all of the test methods, patent publications, patents and reference articles are hereby incorporated by reference either in their entirety or for the relevant portion for which they are referenced, including the related application.

The invention claimed is:

1. A process to form bimodal polypropylene compositions comprising:
   1) combining at least two polypropylenes comprising:
      a) a high molecular weight polypropylene, HMW PP, having a weight average molecular weight (Mw) of 300,000 g/mole or more, and a MWD within the range from 2.0 to 4.5; and
      b) a low molecular weight polypropylene, LMW PP, having a weight average molecular weight (Mw) of 300,000 g/mole or less, and a MWD within the range from 2.0 to 4.5, in at least a two-pass process, and
   2) forming a bimodal polypropylene composition having a Flexural Modulus (190° C., 1% secant) of at least 1700 MPa, wherein the Flexural Modulus of the bimodal polypropylene composition is equal to or at least 5% greater than the HMW PP Flexural Modulus alone, and the bimodal polypropylene composition has one or more of the following characteristics:
  (a) a melt flow rate ($MFR_{bPP}$, 230° C., 2.16 kg) within the range from 2 g/10 min to 200 g/10 min; and/or
  (b) a combined molecular weight distribution ($Mw_{bPP}/Mn_{bPP}$, $MWD_{bPP}$) within the range from 2.5 to 20.0, and/or
  (c) a ΔMw, the Mw difference between at least two polypropylenes, of at least 100,000 g/mole; and
3) injection molding or blow molding articles from the bimodal polypropylene composition.

2. The process of claim 1, wherein at least one of the polypropylenes is formed from a single-site catalyst.

3. The process of claim 1, wherein the at least two polypropylenes comprise:
  30-60 wt % of the BMW PP, wherein the weight average molecular weight (Mw) is 400,000 g/mole or more; and
  40-70 wt % of the LMW PP, wherein the weight average molecular weight (Mw) is 200,000 g/mole or less;
  wherein the ΔMw between the BMW PP and the LMW PP is at least 200,000 g/mol.

4. The process of claim 1, wherein the combining takes place at a $T_{melt}$ within the range from 140° C. to 230° C.

5. The process of claim 1, wherein the process is a melt blending process that takes place in an extruder having a feeder zone and a die zone, wherein a temperature gradient is provided from a feeder zone to a die zone of at least +20° C.

6. A process comprising forming pellets or an article from the melt blended bPP produced by the process of claim 5, wherein processing of the bimodal polypropylene to form pellets or an article takes place at a Shear Viscosity ($\eta_{2500}$, 190° C., using Capillary Rheology) of less than 60 Pa·sec at 2500 l/sec.

7. The process of claim 1, wherein the bimodal polypropylene composition has a Flexural Modulus within the range from 1700 MPa to 3000 MPa.

8. The process of claim 1, wherein the Flexural Modulus of the bimodal polypropylene composition is equal to or at least 15% greater than the HMW component Flexural Modulus alone.

9. The process of claim 1, comprising combining within the range from 5 wt % to 65 wt % (based upon weight of the blend) of the HMW PP and within the range from 35 wt % to 95 wt % (based upon weight of the blend) of the LMW PP.

10. The process of claim 1, wherein the two-pass process comprises:
  a) combining 5 wt % to 65 wt % (based upon weight of the combined components) of the HMW PP, with 35 wt % to 95 wt % (based upon weight of the combined components) of the LMW PP, where the difference in Mw between the HMW PP and the LMW PP is at least 100,000 g/mol;
  b) melt blending in an extruder the components in a) at a melt $T_{melt}$ within the range from 140° C. to 230° C.;
  c) introducing the first melt blend from b) into the same or different extruder and further melt blending the solid blend, where the extruder at a $T_{melt}$ within the range from 140° C. to 230° C.; and
  d) isolating the blend produced in step c) to produce the bimodal polypropylene composition.

11. The process of claim 10, further comprising cooling the blend produced in step b) to produce the first melt blend which is then used in step c).

12. The process of claim 1, wherein the articles from the bimodal polypropylene composition are blow molded.

13. The process of claim 1, wherein the articles from the bimodal polypropylene composition are injection molded.

14. The process of claim 1, wherein the at least two polypropylenes comprise:
  30-60 wt % of the HMW PP, wherein the weight average molecular weight (Mw) is 400,000 g/mole or more, and the MWD within the range from 2.0 to 4.5; and
  40-70 wt % of the LMW PP, wherein the weight average molecular weight (Mw) is 200,000 g/mole or less, and the MWD within the range from 2.0 to 4.5;
  wherein the ΔMw between the BMW PP and the LMW PP is at least 200,000 g/mol.

15. A polypropylene composition comprising:
  a) 35 wt. % to 60 wt. % of a high molecular weight polypropylene having a weight average molecular weight of 400,000 g/mole or more, and a MWD within the range from 2.0 to 4.5; and
  b) 40 wt. % to 65 wt. % of a low molecular weight polypropylene having a weight average molecular weight of 300,000 g/mole or less, and a MWD within the range from 2.0 to 4.5, based on a combined weight of the high and low molecular weight polypropylene,
said polypropylene composition having a Flexural Modulus (190° C., 1% secant) of at least 1700 MPa, wherein the Flexural Modulus of the polypropylene composition is equal to or at least 5% greater than a Flexural Modulus of the high molecular weight polypropylene alone, and wherein the high molecular weight polypropylene and the low molecular weight composition have been melt blended together and the weight average molecular weight of the high molecular weight polypropylene is at least 200,000 g/mol greater than weight average molecular weight of the low molecular weight polypropylene.

16. The polypropylene compositions of claim 15, wherein the low molecular weight polypropylene has a weight average molecular weight (Mw) of 200,000 g/mole or less.

17. The polypropylene composition of claim 15, having a Heat Deflection Temperature (HDT) of greater than 95° C.

18. The polypropylene composition of claim 15, having a melting point temperature $T_{m2}$ within the range from 150° C. to 165° C.

19. The polypropylene composition of claim 15, having a Flexural Modulus within the range from 1700 MPa to 3000 Mpa.

20. The polypropylene composition of claim 15, wherein the Flexural Modulus is equal to or at least 15% greater than the Flexural Modulus of the high molecular weight polypropylene alone.

21. The polypropylene compositions of claim 15, wherein the polypropylene composition has a melt flow rate ($MFR_{bPP}$, 230° C., 2.16 kg) within the range from 2 g/10 min to 200 g/10 min.

22. The polypropylene composition of claim 15, wherein the weight average molecular weight of the high molecular weight polypropylene is within a range from 400,000 g/mole to 1,000,000 g/mole.

23. The polypropylene composition of claim 15, wherein the weight average molecular weight of the low molecular weight polypropylene is within a range from 50,000 g/mole to 200,000 g/mole.

24. The polypropylene composition of claim 15, having a Shear Viscosity (190° C., Capillary Rheology) $\eta_{2500}$ value of less than 60 Pa·sec at 2500 l/sec.

25. The polypropylene composition of claim 15, having a ratio of Complex Viscosities (190° C., SAOS) of zero shear up and at a shear frequency of 200 rad/sec $\eta_{200}$ ($\eta_o/\eta_{200}$) of greater than 10.

26. The polypropylene composition of claim 15, formed by a two-pass melt blending process.

27. The polypropylene composition of claim 15, wherein at least one of the high molecular weight and low molecular weight polypropylenes is formed from a single-site catalyst.

28. The polypropylene composition of claim 15, further comprising another polymeric component selected from the group consisting of styrenic block copolymers, ethylene-propylene elastomers, ethylene-based plastomers, propylene-based elastomers, propylene-based impact copolymers, and combinations thereof.

29. Thermoformed articles, injection molded articles, or blow molded articles, foamed or non-foamed, comprising the polypropylene composition of claim 15.

30. An injection molded article comprising the polypropylene composition of claim 15.

31. A blow molded article comprising the polypropylene composition of claim 15.

* * * * *